United States Patent
Shimauchi

(10) Patent No.: US 12,368,811 B2
(45) Date of Patent: Jul. 22, 2025

(54) IMAGE PROCESSING APPARATUS, IMAGE PROCESSING METHOD, AND PROGRAM FOR DETERMINING COLOR INFORMATION OF AN IMAGE

(71) Applicant: SONY GROUP CORPORATION, Tokyo (JP)

(72) Inventor: Kazuhiro Shimauchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 348 days.

(21) Appl. No.: 17/912,432

(22) PCT Filed: Mar. 4, 2021

(86) PCT No.: PCT/JP2021/008379
§ 371 (c)(1),
(2) Date: Sep. 16, 2022

(87) PCT Pub. No.: WO2021/192887
PCT Pub. Date: Sep. 30, 2021

(65) Prior Publication Data
US 2023/0122083 A1     Apr. 20, 2023

(30) Foreign Application Priority Data
Mar. 25, 2020   (JP) ................. 2020-055121

(51) Int. Cl.
*G06T 5/00*     (2024.01)
*G06T 5/50*     (2006.01)
(Continued)

(52) U.S. Cl.
CPC ............... *H04N 1/60* (2013.01); *G06T 5/50* (2013.01); *G06T 7/90* (2017.01); *G06V 10/758* (2022.01);
(Continued)

(58) Field of Classification Search
CPC ...... H04N 1/62; H04N 1/4072; H04N 1/4177; H04N 1/60; H04N 1/6075;
(Continued)

(56) References Cited

U.S. PATENT DOCUMENTS

| | | | |
|---|---|---|---|
| 2008/0205751 A1* | 8/2008 | Mischler | H04N 1/38 382/163 |
| 2012/0045126 A1* | 2/2012 | Tomohiro | H04N 1/62 382/167 |

(Continued)

FOREIGN PATENT DOCUMENTS

| | | | |
|---|---|---|---|
| JP | H08154172 A | 6/1996 | |
| JP | H11-272864 A | 10/1999 | |

(Continued)

OTHER PUBLICATIONS

Zhang, Zhengyou, and Li-Wei He. "Whiteboard scanning and image enhancement." Digital signal processing 17.2 (2007): 414-432.*

(Continued)

*Primary Examiner* — Li Liu
(74) *Attorney, Agent, or Firm* — Paratus Law Group, PLLC

(57) ABSTRACT

An image processing apparatus (100) includes a determination unit configured to determine, on the basis of color information of a detected writing target, color information of an output image generated from a writing content image that is an image of a writing content written on the writing target.

20 Claims, 24 Drawing Sheets

(51) Int. Cl.
  *G06T 7/90* (2017.01)
  *G06V 10/75* (2022.01)
  *H04N 1/60* (2006.01)

(52) U.S. Cl.
  CPC .............. *G06T 2207/10024* (2013.01); *G06T 2207/20024* (2013.01); *G06T 2207/20221* (2013.01)

(58) Field of Classification Search
  CPC ... G06T 2207/10024; G06T 7/90; G06T 1/00; G06V 10/56; G06V 10/758
  See application file for complete search history.

(56) References Cited

U.S. PATENT DOCUMENTS

| | | | |
|---|---|---|---|
| 2014/0126005 A1* | 5/2014 | Hanawa | H04N 1/6027 |
| | | | 358/1.9 |
| 2019/0045087 A1* | 2/2019 | Shimamura | H04N 1/62 |
| 2019/0364172 A1* | 11/2019 | Une | G06T 7/90 |
| 2020/0105027 A1* | 4/2020 | Kobayashi | G06T 5/77 |

FOREIGN PATENT DOCUMENTS

| | | |
|---|---|---|
| JP | 2009-206721 A | 9/2009 |
| JP | 2014-096651 A | 5/2014 |
| JP | 2014-115804 A | 6/2014 |
| JP | 2016-030369 A | 3/2016 |
| JP | 2017-046343 A | 3/2017 |
| JP | 2019-204990 A | 11/2019 |
| JP | 2019-205061 A | 11/2019 |

OTHER PUBLICATIONS

Jaribka, Ondrej, and Marek Suppa. "Generation of lecture notes as images from recorded whiteboard and blackboard based presentations." 2016.*

* cited by examiner

FIG. 5
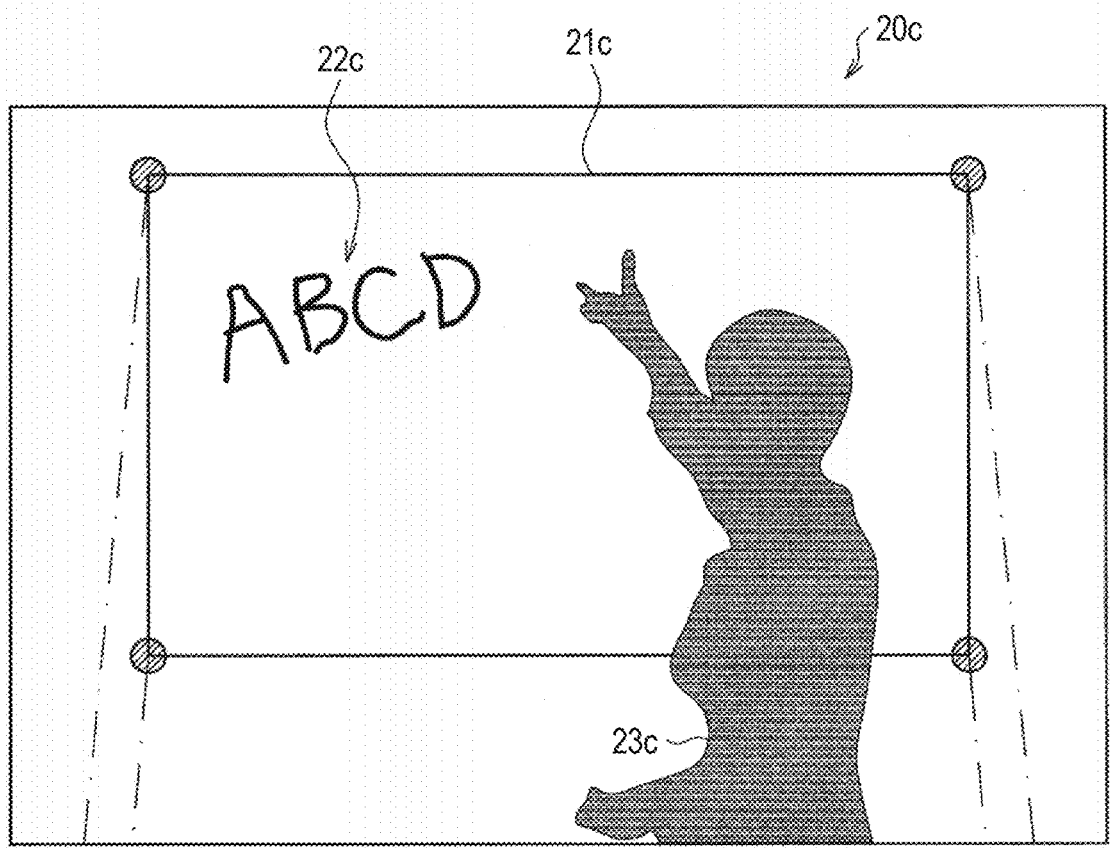
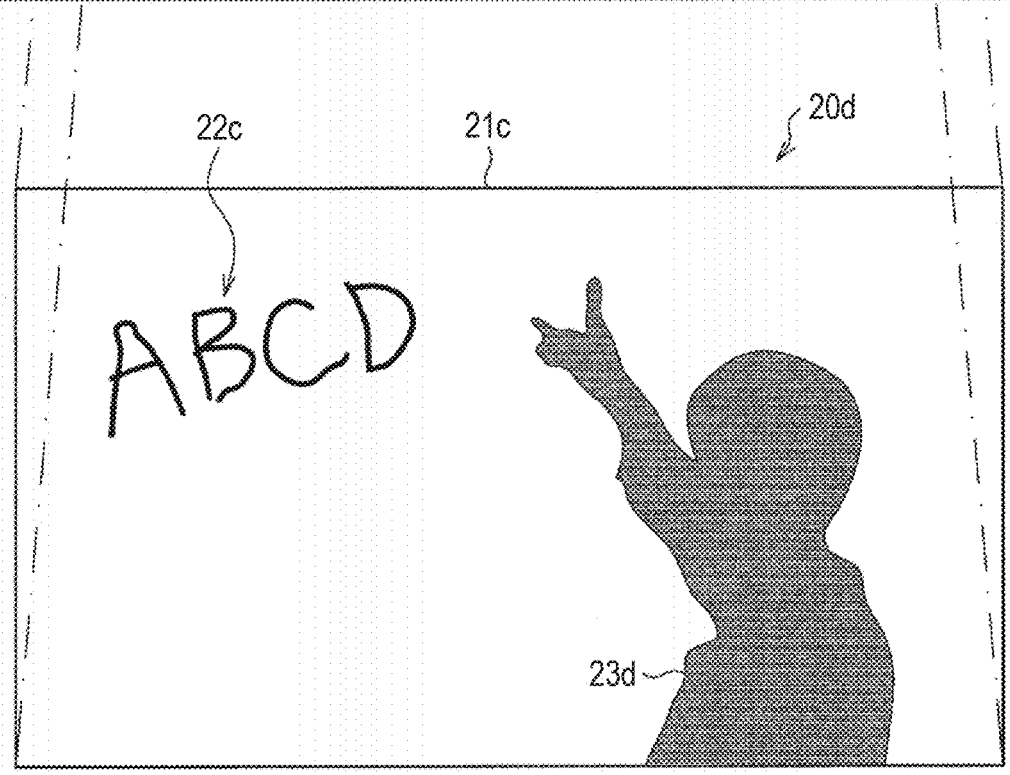

FIG. 25
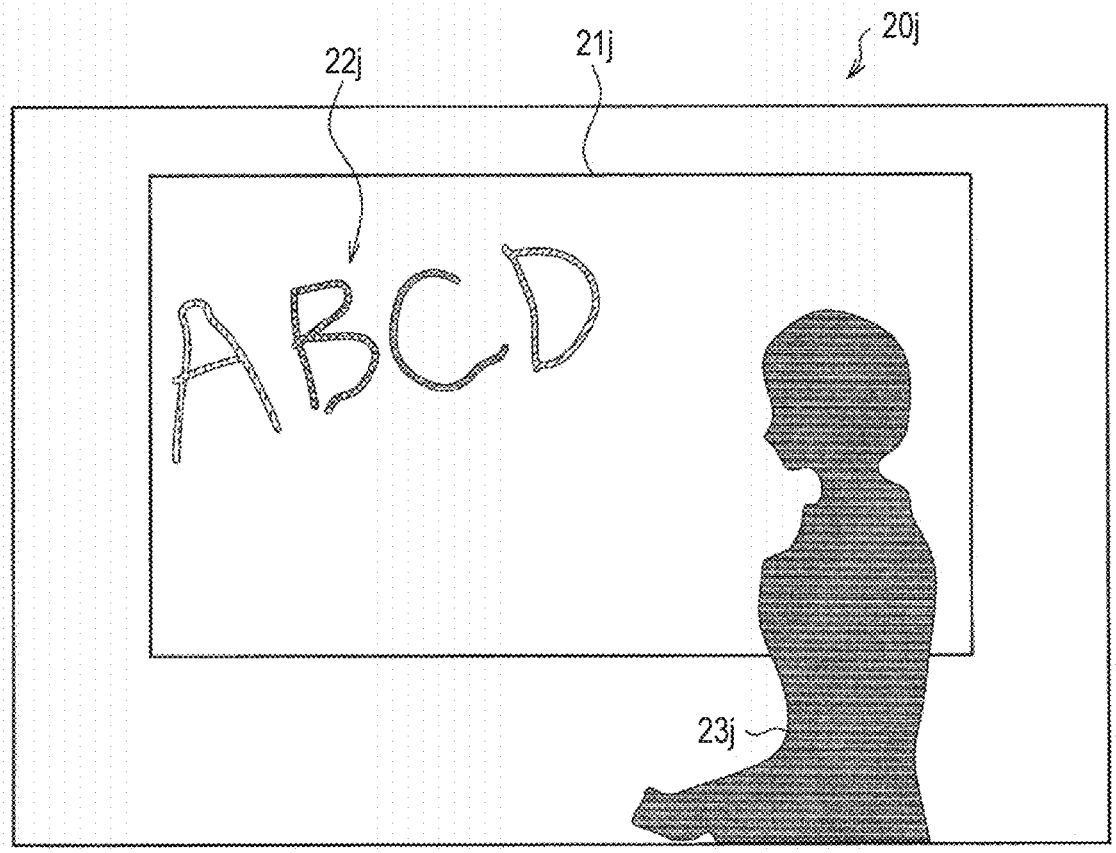
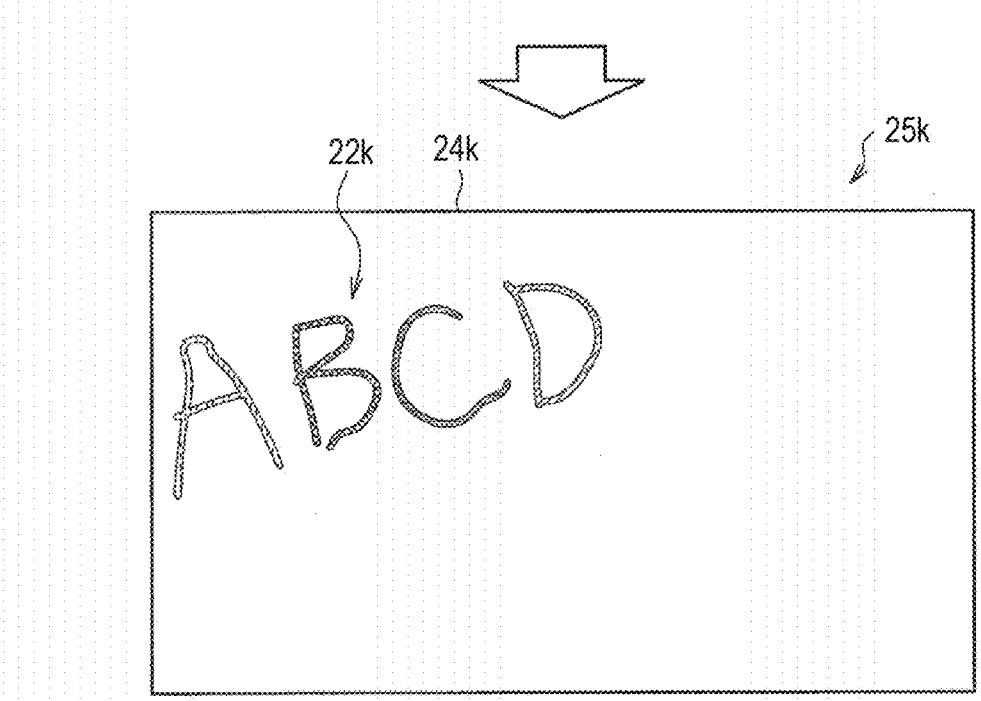

FIG. 26
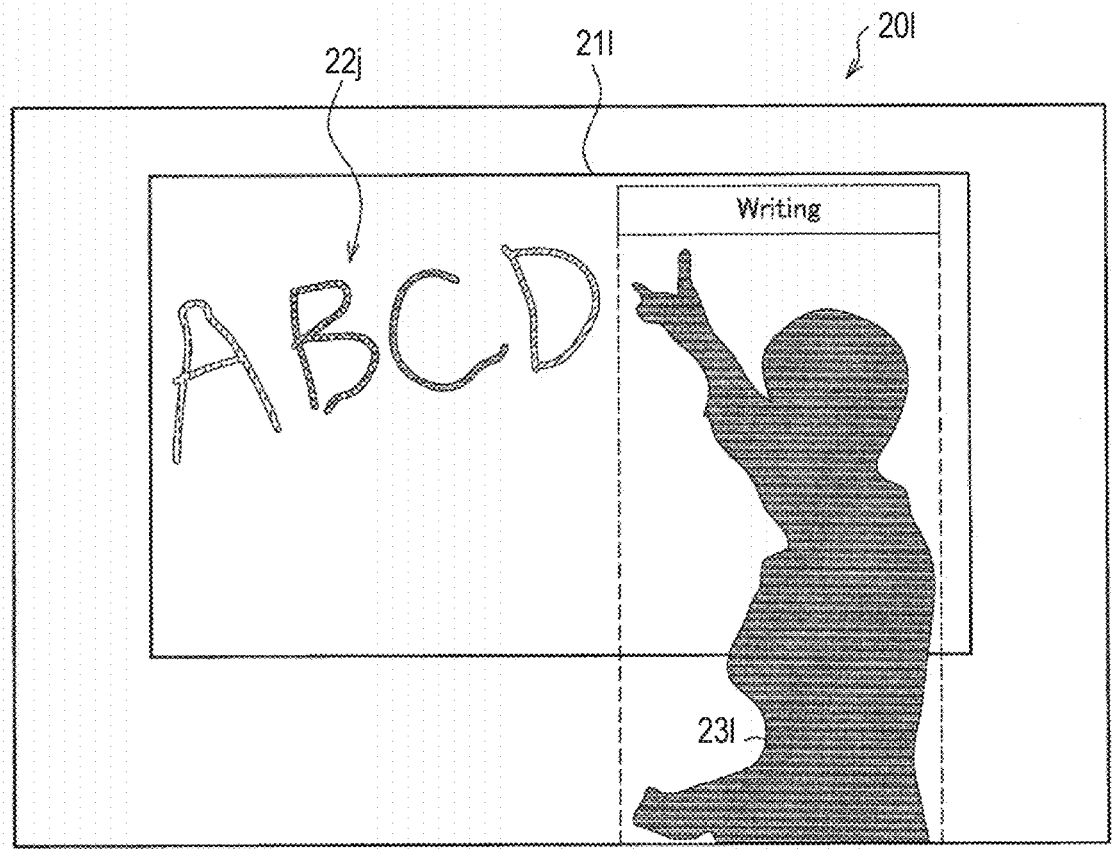
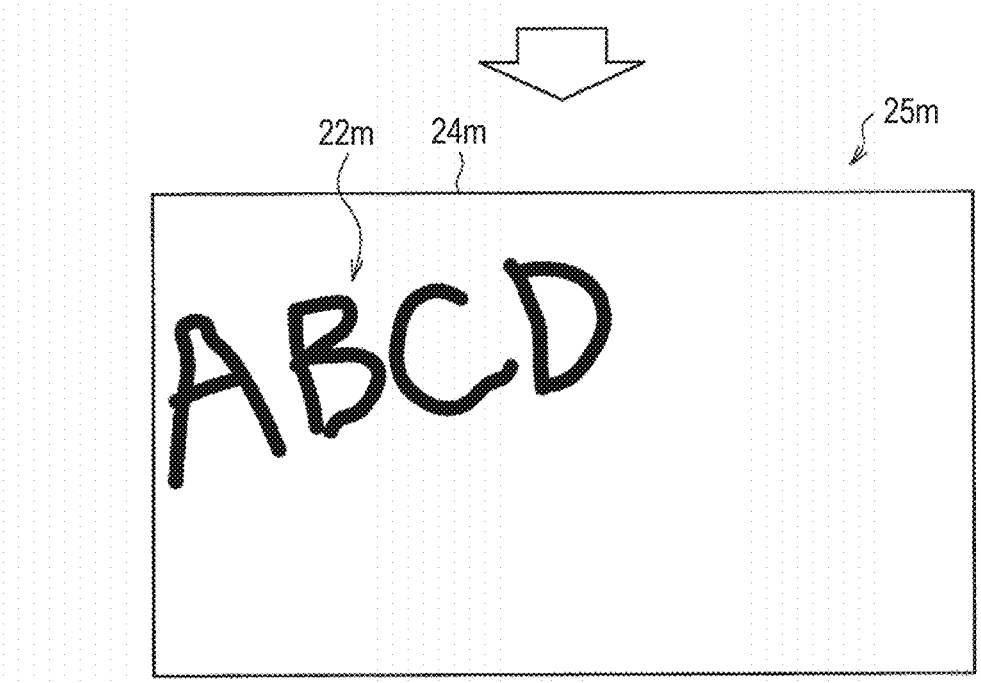

IMAGE PROCESSING APPARATUS, IMAGE PROCESSING METHOD, AND PROGRAM FOR DETERMINING COLOR INFORMATION OF AN IMAGE

CROSS REFERENCE TO PRIOR APPLICATION

This application is a National Stage Patent Application of PCT International Patent Application No. PCT/JP2021/008379 (filed on Mar. 4, 2021) under 35 U.S.C. § 371, which claims priority to Japanese Patent Application No. 2020-055121 (filed on Mar. 25, 2020), which are all hereby incorporated by reference in their entirety.

TECHNICAL FIELD

The present disclosure relates to an image processing apparatus, an image processing method, and a program.

BACKGROUND ART

In recent years, there has been developed a technique of extracting writing written on a blackboard, a white board, or the like and outputting information of the extracted writing. For example, Patent Document 1 discloses a technique of capturing an image of a blackboard, a white board, or the like, extracting an image corresponding to the writing on board from the captured image, and outputting the extracted image.

CITATION LIST

Patent Document

Patent Document 1: Japanese Patent Application Laid-Open No. 2016-30369

SUMMARY OF THE INVENTION

Problems to be Solved by the Invention

However, in the technique described in Patent Document 1, since the extracted image is directly output as monochrome image data, it is assumed that visibility of the image is not good. In addition, even in a case where the extracted image is output as it is as a color image, since the appearances can be different between a case where the writing on board is directly viewed in the physical space and a case where the writing on board is viewed on the display, it is assumed that the visibility of the image is not good.

In general, writing on board is performed in a form suitable for the object to be written. Therefore, in a case where the image of the writing on board is extracted, combined with the image of the background different from the object to be written, and output as the output image, it is assumed that the visibility of the image of the writing on board in the output image is not good.

Therefore, an object of the present disclosure is to provide an image processing apparatus, an image processing method, and a program capable of emphasizing visibility of a writing content image that is an image of a writing content written on a writing target.

Solution to Problems

In order to solve the above problem, an image processing apparatus according to an embodiment of the present disclosure includes a determination unit configured to determine color information of an output image generated from a writing content image that is an image of a writing content written on a writing target on the basis of color information of the detected writing target.

BRIEF DESCRIPTION OF DRAWINGS

FIG. 5 is a diagram for explaining an example of extraction processing of a writing target region by the extraction unit 12 according to the embodiment.

FIG. 25 is a diagram for explaining an example of correction processing based on action detection information indicating whether or not the writer is performing writing on a writing target image 21 by a correction unit 13 according to the present embodiment.

FIG. 26 is a diagram for explaining an example of correction processing based on action detection information indicating whether or not the writer is performing writing on the writing target image 21 by the correction unit 13 according to the present embodiment.

MODE FOR CARRYING OUT THE INVENTION

Figure 1:
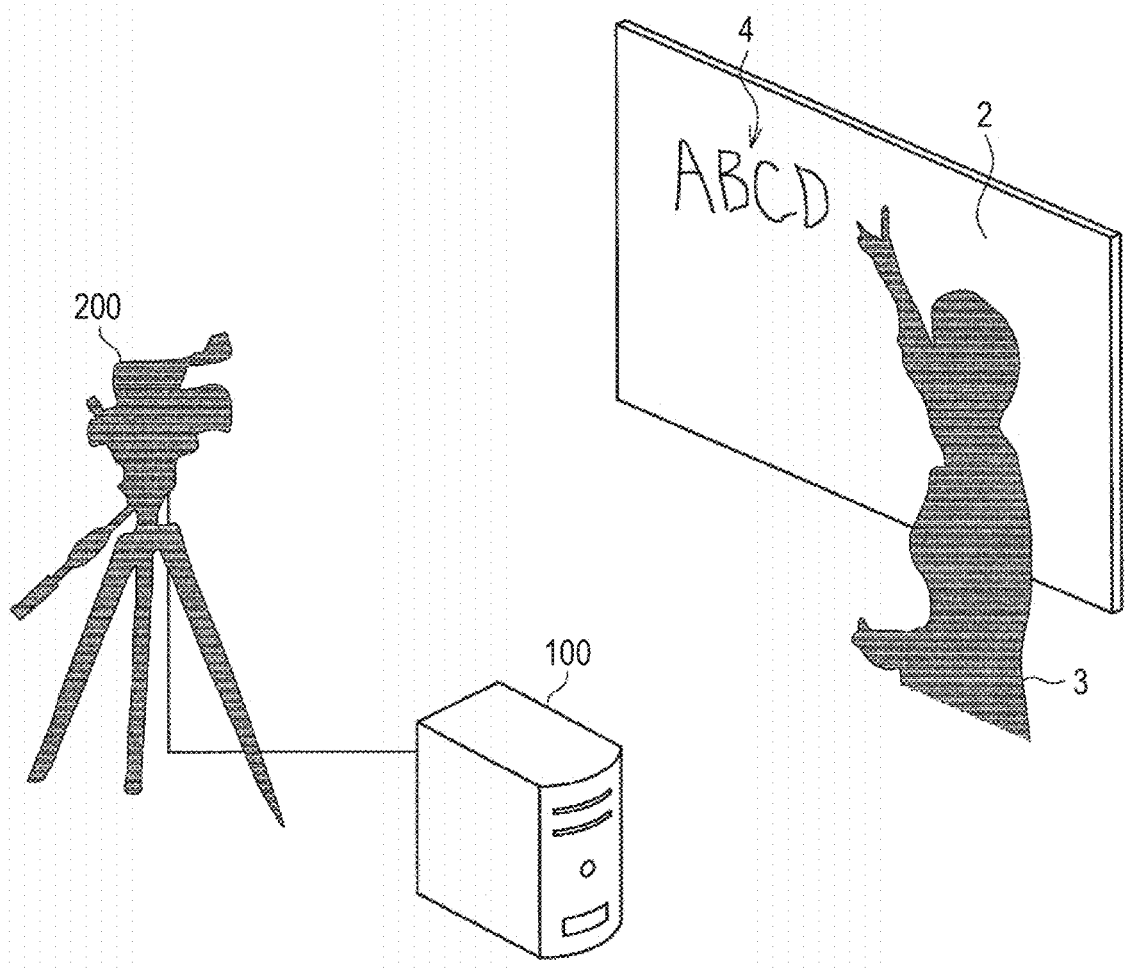
FIG. 1 is a diagram for explaining an overview of an image processing apparatus 100 and an input device 200 according to an embodiment of the present disclosure.

Hereinafter, embodiments of the present disclosure will be described in detail on the basis of the drawings. Note that, in each of the following embodiments, the same parts are denoted by the same reference numerals, and redundant description will be omitted.

In addition, the present disclosure will be described according to the following order of items.

(first embodiment)
1-1. Background
1-2. Overall configuration example
1-3. Functional configuration example
2. Operation example
3. Application Example
3-1. Application Example 1
3-2. Application Example 2
3-3. Application Example 3
3-4. Application Example 4
3-5. Application Example 5
3-6. Application Example 6
3-7. Application Example 7
4. Hardware Configuration Example
5. Summary

1. EMBODIMENT 1-1. Background

First, the background of the embodiment of the present disclosure will be described.

In recent years, a technology has been developed in which from an image obtained by imaging a blackboard, a white board, or the like (hereinafter, referred to as a writing target 2), writing on board (hereinafter, it is referred to as a writing content 4) written on the writing target 2 is extracted and the extracted writing content 4 is output as an image. In a scene of a lecture, a conference, or the like, an image (hereinafter, it is referred to as a writing content image 22) of the writing content 4 is output to a display or the like, so that, for example, a participant who is at a remote location can easily confirm the writing content.

By the way, in a case where the captured writing content 4 is output as it is as the writing content image 22, it is assumed that the visibility of the writing content image 22 is not good. The reason is that, for example, the appearance may be different between the case of directly viewing the writing content in the physical space and the case of viewing the writing content image 22 on the display.

In addition, the color used frequently at the time of writing may be generally different for each type of the writing target 2. Therefore, it is assumed that the visibility of the writing content image 22 included in the output image is not good due to the combination of the color used for writing and the color of the background of the output image.

A technical idea according to an embodiment of the present disclosure has an aspect conceived by focusing on the above point, and enables correction of the form of the writing content image so as to enhance the visibility of the writing content image. Hereinafter, configuration examples and operation examples according to embodiments of the present disclosure will be sequentially described in detail.

1-2. Overall Configuration Example

Subsequently, an overview of an image processing apparatus 100 and an input device 200 according to an embodiment of the present disclosure will be described with reference to FIG. 1.

FIG. 1 is a diagram for explaining an overview of the image processing apparatus 100 and the input device 200 according to an embodiment of the present disclosure. FIG. 1 illustrates the image processing apparatus 100 and the input device 200 connected to the image processing apparatus 100.

The writing target 2 is an object on which visual information (writing content 4) such as a point, a line, a character, a sentence, a mathematical expression, a symbol, a picture, a figure, or an image is written. The writing target 2 is a blackboard, a whiteboard, electronic paper, a touch panel, or the like.

A writer 3 performs an operation on the writing target 2. For example, the writer 3 writes the writing content 4 on the writing target 2.

The writing content 4 is visual information written on the writing target 2. As described above, the writing content 4 is written on the writing target 2 by the choke, the marker, the stylus, the finger, or the like. Note that the writing content 4 may have various colors. For example, in a case where the writing target 2 is a blackboard, the writing content 4 is white, red, yellow, or the like.

The input device 200 is a device that receives information about a physical space in which the input device 200 is installed. The input device 200 includes, for example, an imaging device and a voice input device. The imaging device includes a lens system including an imaging lens, a diaphragm, a zoom lens, a focus lens, and the like, a drive system that causes the lens system to perform a focusing operation or a zooming operation, a solid state imaging element array that photoelectrically converts imaging light obtained by the lens system to generate an imaging signal, and the like. The voice input device includes signal processing circuits such as a microphone that collects surrounding sound, a microphone amplifier circuit that amplifies and processes a voice signal obtained by the microphone, an A/D converter, and a noise canceller. The input device 200 outputs image data that is a digital signal and voice data at the time of imaging.

The input device 200 can image an object in the physical space as an imaging target. Note that the input device 200 may capture the image of the writing target 2 on which the writing content 4 is written in the physical space as the imaging target, and output the imaging time and the image (hereinafter, referred to as a captured image 20) obtained by the imaging to the image processing apparatus 100 in association with each other. The captured image 20 may include other than the writing target 2 and the writing content 4. In this case, the input device 200 outputs the captured image in which an image other than the writing target 2 and the writing content 4 is also captured to the image processing apparatus 100.

In addition, the function as the input device 200 may be included in the writing target 2. For example, the input device 200 and the writing target 2 are also realized as an electronic blackboard. The input device 200 as the electronic blackboard may acquire the image corresponding to the captured image 20 described above by scanning the state of the writing target 2. In this case, the input device 200 acquires the image of the writing target 2 on which the writing content 4 is written and provides the image to the image processing apparatus 100. The image may be treated similarly to the captured image 20 after being provided to the image processing apparatus 100. Note that the images acquired by the input device 200 and the writing target 2 realized as the electronic blackboard can include only the writing target 2 and the writing content 4.

The image processing apparatus 100 is a device that extracts the writing content image 22 from the captured image 20 input by the input device 200 and corrects the form of the extracted writing content image 22. The image processing apparatus 100 outputs an image (hereinafter, referred to as an output image 25) including the corrected writing content image 22 to an output device 300 (not illustrated in FIG. 1) to be described later.

Here, the form of the writing content image 22 refers to, for example, a color, a width, a contour, and the like of the writing content image 22. Details of the correction of the color, width, and contour of the writing content image 22 by the image processing apparatus 100 will be described later. Note that the image processing apparatus 100 may be connected to input device 200 in a wired manner or in a wireless manner.

1-3. Functional Configuration Example

Figure 2:
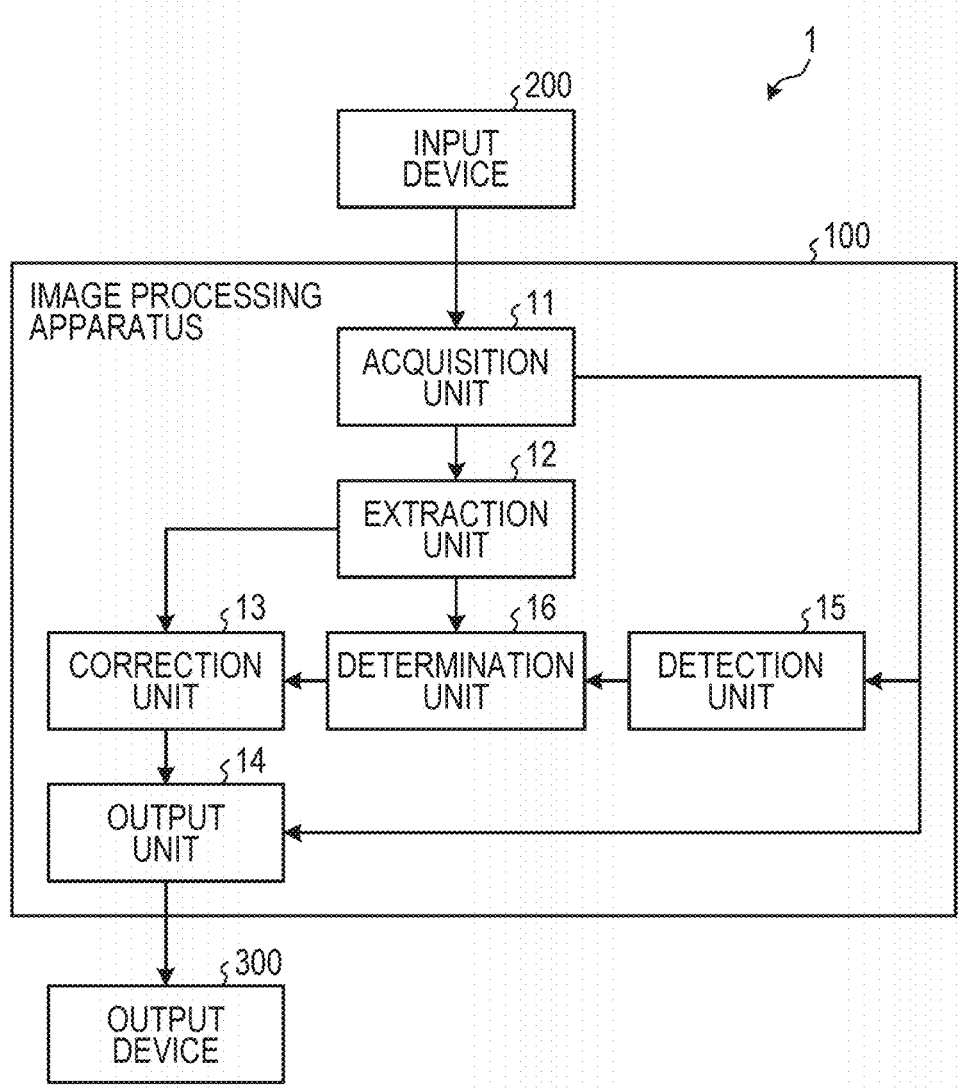
FIG. 2 is a diagram for explaining an example of a functional configuration of a system 1 according to the present embodiment.

Hereinafter, an example of a functional configuration of a system 1 according to the present embodiment will be described. FIG. 2 is a diagram for explaining an example of a functional configuration of the system 1 according to the present embodiment. As illustrated in FIG. 2, the system 1 includes the image processing apparatus 100, the input device 200, and the output device 300.

1-3-1. Input Device 200

The input device 200 receives the captured image 20 to output the captured image 20 to the image processing apparatus 100.

1-3-2. Image Processing Apparatus 100

The image processing apparatus 100 is an apparatus that controls the entire operation of the system 1. The image processing apparatus 100 is realized by any device such as a personal computer (PC), a smartphone, or a tablet terminal.

The image processing apparatus 100 extracts the writing content image 22 from the captured image input by the input device 200, and the image processing apparatus 100 corrects the form of the extracted writing content image 22 and generates the output image 25 including the corrected writing content image 22 and having a predetermined color as the background.

As illustrated in FIG. 2, the image processing apparatus 100 includes an acquisition unit 11, an extraction unit 12, a correction unit 13, an output unit 14, a detection unit 15, and a determination unit 16.

1-3-2-1. Acquisition Unit 11

The acquisition unit 11 has a function of acquiring the captured image 20 from the input device 200. The captured image 20 may include other than the writing target 2 on which the writing content 4 is written.

Figure 3:
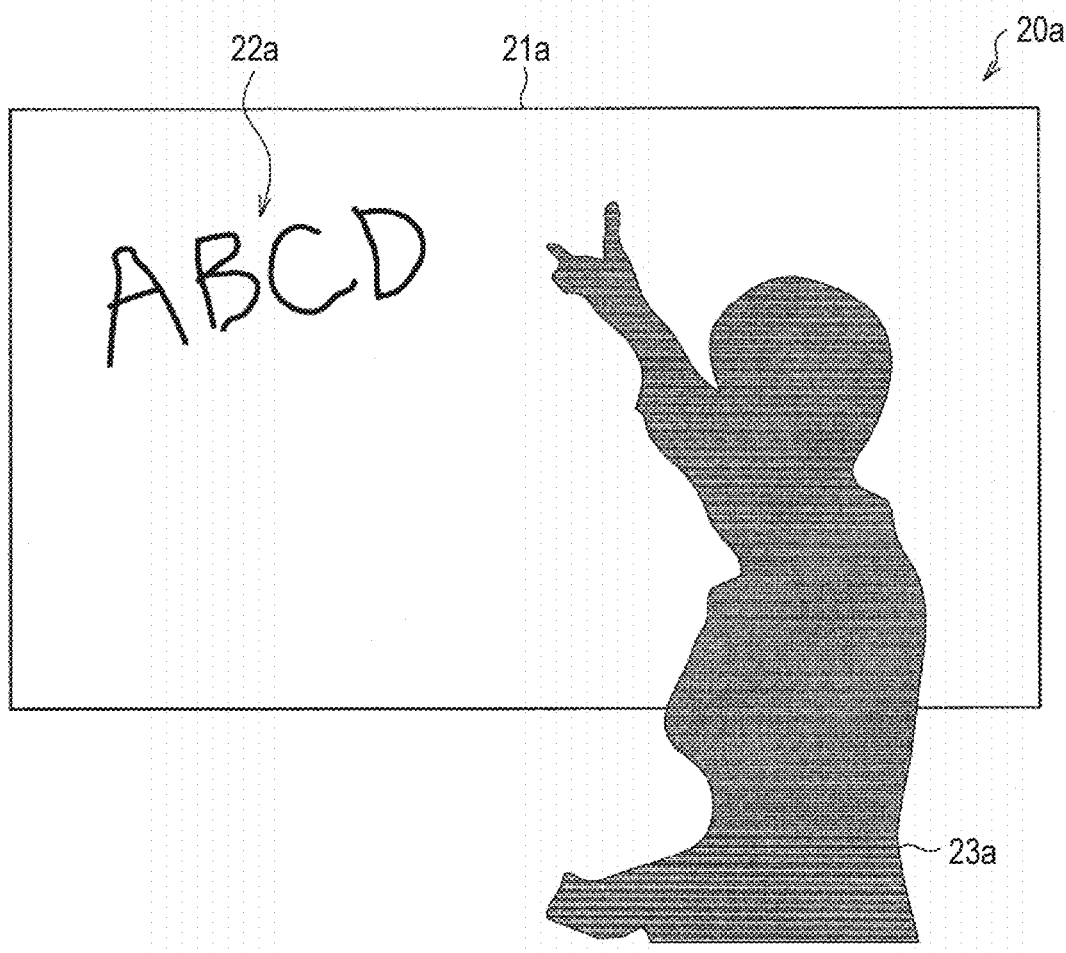
FIG. 3 is a diagram for explaining an example of an image acquired by an acquisition unit 11 according to the embodiment.

Here, an example of the captured image 20 acquired by the acquisition unit 11 according to the present embodiment will be described with reference to FIG. 3. FIG. 3 is a diagram for explaining an example of the captured image 20 acquired by the acquisition unit 11 according to the present embodiment. FIG. 3 illustrates a captured image 20a. The captured image 20a includes a writing target image 21a, a writing content image 22a, and a writer image 23a.

In the example of FIG. 3, the captured image 20a includes the writer image 23a and other regions in addition to the writing target image 21a and the writing content image 22a.

Here, as described above, a writing target image 21 refers to a region (image) in which the writing target 2 in the captured image 20 is captured. In addition, the writing content image 22 refers to a region (image) in which the writing content 4 in the captured image 20 is captured.

Note that, in the captured image 20, the writing content image 22 may have a size equal to or larger than a predetermined ratio. As the captured image 20, an image subjected to white balance correction may be used. In a case where the input device 200 is the electronic blackboard, it can be easy to acquire the image including only the writing target image 21 and the writing content image 22 by the acquisition unit 11. On the other hand, even in a case where the input device 200 is the electronic blackboard, the acquisition unit 11 may acquire the captured image 20 obtained by the imaging device imaging the electronic blackboard from the input device 200.

1-3-2-2. Extraction Unit 12

The extraction unit 12 extracts the writing content image 22 from the captured image 20. Specifically, the extraction unit 12 extracts the writing content image 22 independent from the writing target image 21 and the like. That is, the extraction unit 12 generates image data including only the writing content image 22. Examples of a method of extracting the writing content image 22 include binarization processing, edge detection, and the like.

Figure 4:
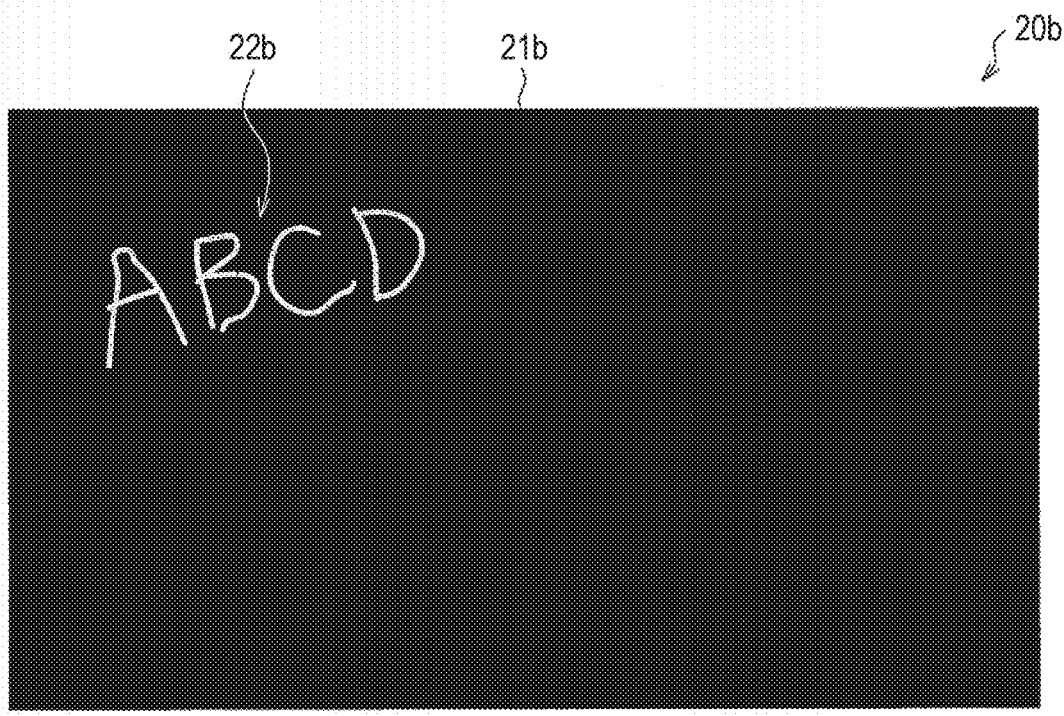
FIG. 4 is a diagram for explaining an example of extraction processing by an extraction unit 12 according to the embodiment.

FIG. 4 is a diagram for explaining an example of extraction processing by the extraction unit 12 according to the present embodiment. FIG. 4 illustrates a captured image 20b after the extraction processing. The captured image 20b after the extraction processing includes a writing content image 22b. The writing target image 21 is removed and is a margin 21b. As illustrated in FIG. 4, the writing content image 22b can be extracted. Here, in the example illustrated in FIG. 4, the writing content image 22b is white.

However, there may be a situation where it is difficult to extract only the writing content image 22 by the binarization processing or the like by the extraction unit 12. For example, as illustrated in FIG. 3, the captured image 20 may include a writer image 23 and other regions in addition to the writing target image 21 and the writing content image 22, and for example, in a case where the binarization processing is executed, a region other than the writing content image 22 is extracted. In order to extract only the writing content image 22, it is necessary to first remove the writer image 23 and other regions from the captured image 20.

The extraction unit 12 performs an extraction process of the writing target region in order to remove other regions. In addition, the extraction unit 12 executes separation processing of the writer image 23 in order to remove the writer image 23. Hereinafter, details of the extraction processing of the writing target region and the separation processing of the writer image 23 will be described.

1-3-2-2-1. Writing Target Region Extraction Processing

First, the processing of extracting the writing target region will be described. Specifically, the processing of extracting the writing target region refers to processing of extracting a region specified by designating a plurality of points, for example, four points in the captured image 20 as the writing target region. Here, the writing target region refers to an image obtained by removing other regions from the captured image 20.

Hereinafter, description will be given with reference to FIG. 5. FIG. 5 is a diagram for explaining an example of extraction processing of the writing target region by the extraction unit 12 according to the present embodiment. FIG. 5 illustrates a captured image 20c and a captured image 20d after extraction of the writing target region.

Here, the captured image 20c includes a writer image 23c and other regions in addition to a writing target image 21c and a writing content image 22c. The extraction unit 12 generates the captured image 20d after extraction of the writing target region on the basis of a plurality of points designated to surround the region of the writing target 2 on the basis of the writing target image 21c. The captured image 20d after extraction of the writing target region includes the writing target image 21c, the writing content image 22c, and part 23d of the writer.

1-3-2-2-2. Separation Processing of Writer Image 23 and Writing Content Image 22

Next, the separation process of the writer image 23 and the writing content image 22 will be described.

The captured image 20d, after extraction of the writing target region, extracted by the extraction processing of the captured image 20d after extraction of the writing target region described above includes part 23d of the writer image. In order to extract the writing content image 22 from the captured image 20d after extraction of the writing target region, the extraction unit 12 is required to remove part 23d of the writer image from the captured image 20d after extraction of the writing target region.

Specifically, the separation processing of the writer image 23 and the writing content image 22 refers to, for example, pattern recognition of the shape of the part 23 of the writer image from the captured image 20 after extraction of the writing target region, and excluding the recognized writer image 23.

Figure 6:
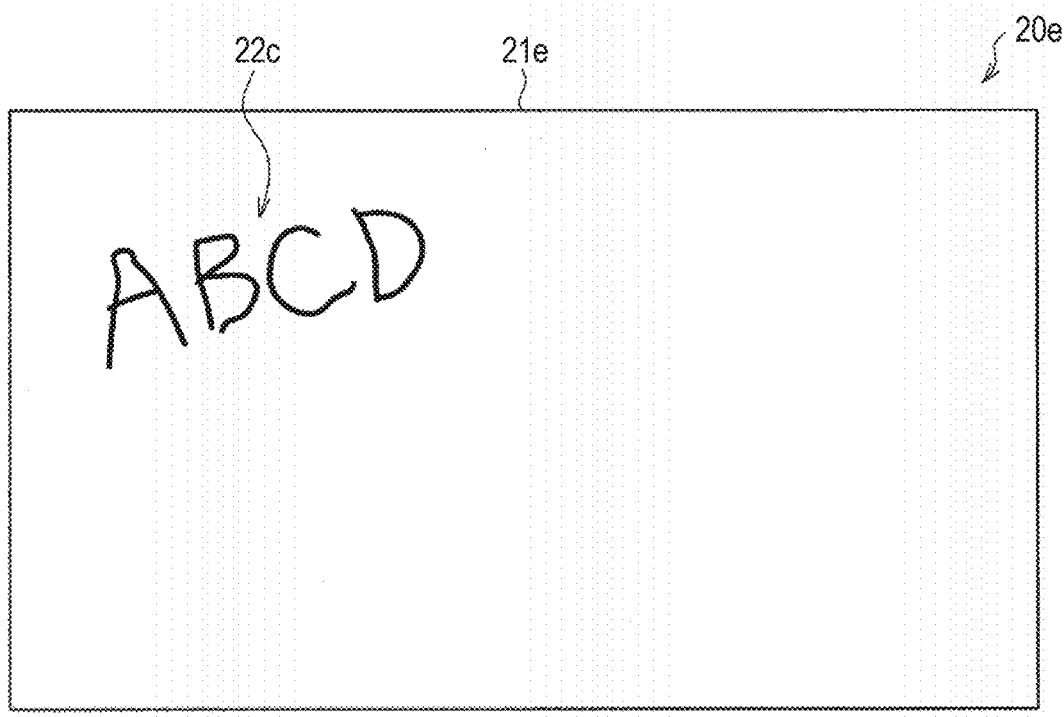
FIG. 6 is a diagram for explaining an example of a result of extraction processing of a writing target region by the extraction unit 12 according to the embodiment.

The extraction unit 12 executes the separation process on the writer image 23 and the writing content image 22 and executes the binarization process on the executed image, thereby generating a captured image 20e, after the extraction process, including a writing target image 21e and the writing content image 22c as illustrated in FIG. 6.

In this way, by executing the extraction processing on the writing target region and the separation processing on the writer image 23, the extraction processing of the writing content image 22 can be correctly executed. Note that, in the above description, the example in which the extraction processing of the writing target region is executed first is described, but the separation processing of the writer image 23 may be executed first.

1-3-2-3. Correction Unit 13

The correction unit 13 corrects the form of the writing content image 22 extracted by the extraction unit 12. Specifically, the correction unit 13 corrects the form of the writing content image 22 extracted by the extraction unit 12 so as to improve the visibility of the writing content image 22 in the output image 25.

Note that the correction of the color of the writing content image 22 by the correction unit 13 means correcting three attributes of the color of the writing content image 22. For example, examples of the three attributes of color include a hue, saturation, and brightness. The correction unit 13 corrects at least one of a hue, saturation, or brightness of the color of the writing content image 22. Note that, in a case where the purpose is to improve visibility, the correction unit 13 may execute correction of one or both of saturation or brightness.

Of course, even in a case where a scale different from the three attributes of color is used, the color correction processing by the correction unit 13 can be executed. For example, in a case where correcting the color of the YUV data, the correction unit 13 may convert the YUW data into HSV data and execute correction of one or both of saturation or brightness.

Hereinafter, as a mere example, a case where the correction unit 13 corrects one or both of saturation or brightness will be described.

The correction unit 13 determines a color correction processing method on the basis of the combination of the type of the writing target image 21 and the background color of the output image 25, and executes the correction processing of the color of the writing content image 22 by the determined correction processing method.

Here, the background of the output image 25 refers to a background of the image output by the output device 300. As a mere example, the writing target image 21 can be used as a background as it is. In this manner, as the background color, a color in the same system as the color corresponding to the writing target 2 can be set, or a color in a different system can be set. For example, in a case where the writing target 2 is a blackboard, another color, other than a deep green color or a black color corresponding to the writing target 2, that is, any color, for example, white or the like, can be set as the background color. In addition, the color of the background may be fixed in each frame of the output image 25 or may be set to a different color for each output image 25.

Note that, in a case where the background color of the output image 25 is assumed to be a fixed color, the correction unit 13 may determine the color correction processing method on the basis of only the type of the writing target image 21.

Next, a determination of a method of color correction processing will be described. Here, the determination of the method of color correction processing refers to, for example, a determination of a filter for correcting saturation and brightness of the writing content image 22. Here, the filter refers to a relationship in which, when saturation or brightness is input, saturation or brightness corresponding to the input saturation or brightness is output.

Note that each of the filter for correcting saturation and the filter for correcting brightness may be independently determined. The correction unit 13 corrects saturation and brightness corresponding to each color of the writing content image 22 extracted by the extraction unit 12 using the filter.

The correction unit 13 may determine a filter corresponding to a combination of the type of the writing target image 21 and the background color of the output image 25 for each of saturation and brightness. Specifically, the correction unit 13 may correct the brightness of the color of the writing content image 22 on the basis of the difference between the brightness of the color of the writing target 2 and the brightness of the background color. More specifically, in a case where the difference between the brightness of the color of the writing target 2 and the brightness of the background color is equal to or larger than a predetermined value, the correction unit 13 may perform correction so as to reverse the brightness of the color of the writing content image 22. That is, the correction unit 13 may correct the brightness of the color of the writing content image 22 so that the relationship in brightness between the plurality of colors of the writing content image 22 is inverted from the relationship in brightness between the plurality of colors before correction.

For example, in a case where the writing target image 21 is a blackboard and the background color of the output image 25 is white, the correction unit 13 may determine a filter that corrects the white writing content image 22 to black. This is because, in a case where the white writing content image 22 is combined with the white background, the visibility of the writing content image 22 decreases. In addition, in a case where the writing content image 22 is combined with a white background, the visibility is high in a case where the color of the writing content image 22 is black.

At this time, the color of the background can be identified as follows. As a mere example, in a case where the color of the writing target image is set as the color of the background, the color of the writing target image can be identified as the color of the background from the writing target image 21 by the image recognition for each frame of the captured image 20. In addition, the color of the writing target image may be known by the user input. In addition, in a case where the color of the writing target image or another color is designated by user setting as the background color, the designated color can be identified as the background color.

In addition, in a case where the writing content image 22 has a plurality of colors, the correction unit 13 may determine a filter in which a difference in saturation or brightness between the plurality of colors of the writing content image 22 is larger than a difference in brightness between the plurality of colors of the writing content image 22 before correction. Specifically, the correction unit 13 may determine the filter so that, among the saturation and brightness of the color of the writing content image 22, saturation and brightness higher than saturation and brightness of other colors are higher, and saturation and brightness lower than saturation and brightness of other colors are lower.

Figure 7:
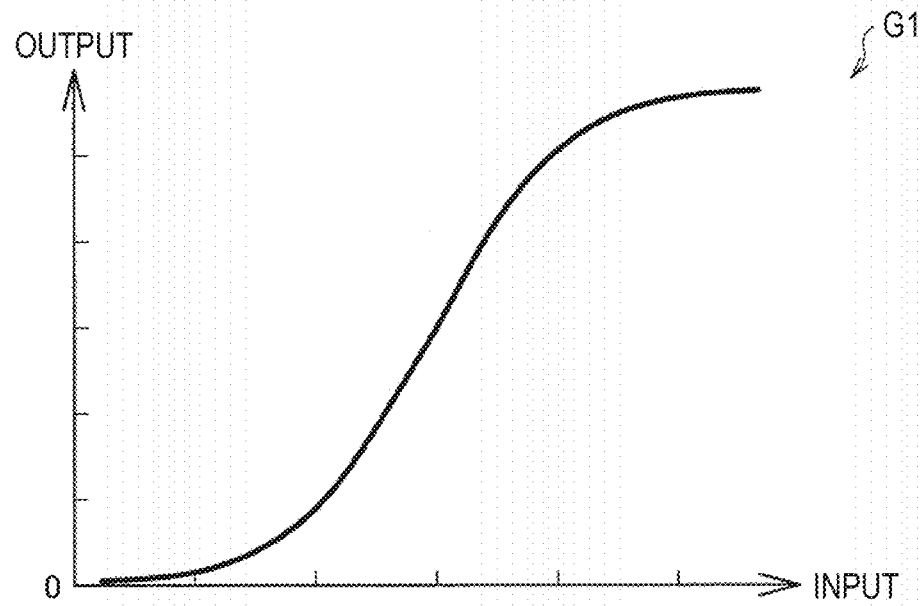
FIG. 7 is a diagram for explaining an example of a correction method by a correction unit 13 according to the embodiment.
Figure 8:
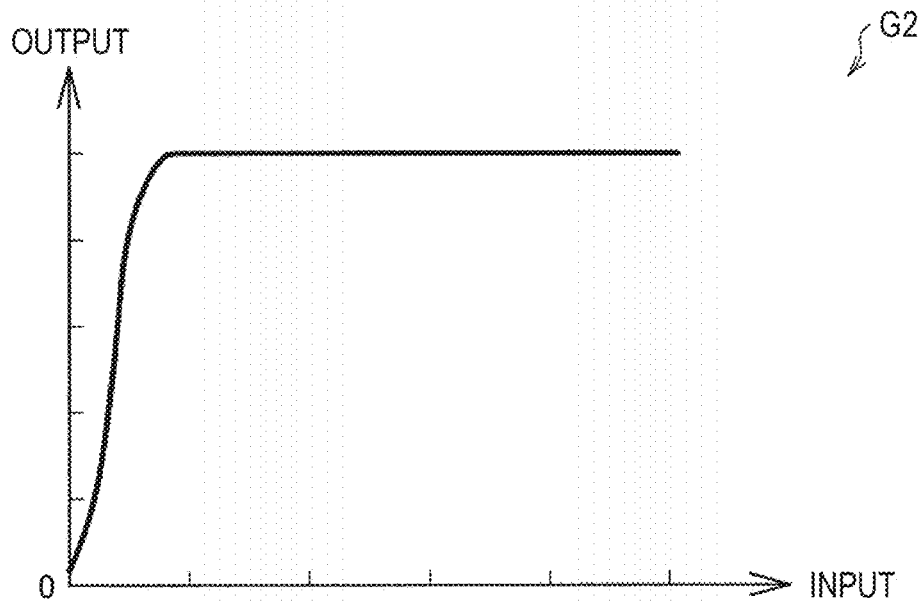
FIG. 8 is a diagram for explaining an example of a correction method by the correction unit 13 according to the embodiment.
Figure 9:
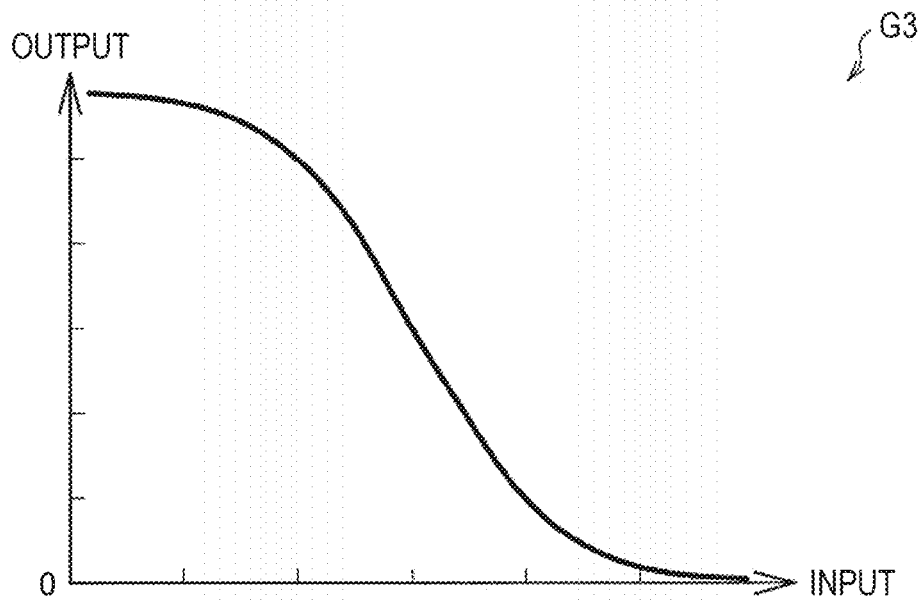
FIG. 9 is a diagram for explaining an example of a correction method by the correction unit 13 according to the embodiment.

Specific examples of the filter as described above will be described below with reference to FIGS. 7 to 9. FIGS. 7 to 9 are diagrams for explaining an example of a correction method by the correction unit 13 according to the present embodiment. Specific examples of filters described below may be usable for both saturation and brightness correction.

FIG. 7 illustrates a graph G1 illustrating a relationship between an input and an output. The "input" shown here is saturation or brightness of the color of the writing content image 22 extracted by the extraction unit 12. In addition, the "output" shown here is the corrected saturation or brightness corresponding to each "input". In the graph G1 illustrated in FIG. 7, saturation or brightness of the "output" is higher than saturation or brightness of the "input" for saturation or brightness equal to or greater than the predetermined value. In addition, on the other hand, as illustrated in FIG. 7, saturation or brightness for the "output" is lower than saturation or brightness for the "input" for saturation or brightness equal to or less than the predetermined value.

Note that the curve of the graph G1 is represented by, for example, Equation (1).

$$\text{OUTPUTnorm} = 1/\{1 + e(s-\text{INPUT}) * \gamma\} \quad (1)$$

In Equation (1), s represents a shift amount in the horizontal axis direction, γ represents a coefficient, and INPUT and OUTPUT represent an input and an output, respectively.

In addition, FIG. 8 illustrates a graph G2 illustrating a relationship between an input and an output different from that in FIG. 7. Unlike the graph G1, the graph G2 has a wide range of saturation or brightness in which the "output" is higher than the "input". For example, in a case where saturation is corrected by the filter as illustrated in the graph G2, for saturation of the color other than an achromatic color and a color close to the achromatic color, saturation of the writing content image 22 extracted by the extraction unit 12 becomes high.

In addition, there may be a filter that inverts saturation or brightness. Here, the reversal of saturation and brightness means that, in each color, correction is performed so as to lower saturation and brightness higher than those of other colors, and correction is performed so as to increase saturation and brightness lower than those of other colors.

FIG. 9 illustrates a graph G3 illustrating a relationship between an input and an output. The graph G3 has an output result opposite to that of the graph G1. Specifically, for saturation or brightness greater than or equal to a predetermined value, saturation or brightness for the "output" is lower than that of the "input", while, for saturation or brightness less than or equal to a predetermined value, saturation or brightness for the "output" is higher than that of the "input".

Note that the curve of the graph G3 is represented by, for example, Equation (2).

$$\text{OUTPUTinv} = 1/\{1 + e(\text{INPUT}-s) * \gamma\} \quad (2)$$

In Equation (2), as in Equation (1), s represents a shift amount in the horizontal axis direction, γ represents a coefficient, and INPUT and OUTPUT represent an input and an output, respectively.

Note that Equations (1) and (2) are merely examples, and filters using other expressions may be used.

The filter illustrated in the graph G3 is used, for example, in a case where the writing content image 22 which is the image of the writing content 4 written on the blackboard is corrected and the output image 25 is generated with the background color being white. Normally, when writing on the blackboard, the writer 3 often writes the white writing content 4 using the white choke. In a case where the output image 25 is generated from the writing content image 22 corresponding to the white writing content 4 and the white background, it may be difficult to distinguish the writing content image 22 from the white background. Therefore, for example, in a case where the type of the writing target 2 is a blackboard and the color of the background is white, the correction unit 13 may use the filter illustrated in the graph G3 to correct the color of the writing content image 22 so as to invert the brightness of the white writing content image 22.

The correction unit 13 may correct saturation and brightness of the color of the writing content image 22 using the filter as illustrated in FIGS. 7 to 9 described above.

Note that the correction unit 13 may use a filter other than the filters illustrated in FIGS. 7 to 9 that increase the difference in saturation and the difference in brightness. In other words, the correction unit 13 may use a filter that does not increase the difference in saturation or the difference in brightness. For example, the correction unit 13 may use a filter that outputs the input saturation or brightness as it is without changing the input saturation or brightness, a filter that inverts the input saturation or brightness to output the inverted saturation or brightness, or the like.

Here, a case where the writing target image 21 is a blackboard, the writing content image 22 has yellow, and the output image 25 in which the background is white is generated will be considered. The brightness of the yellow writing content image 22 written on the blackboard is higher than that of the other colors of the writing content image 22 written on the blackboard, and the yellow may be used to emphasize the yellow writing content image 22 more than the writing content image 22 of the other colors. However, in a case where the writing target image 21 is a blackboard and the output image 25 in which the background is white is generated, a filter that inverts the brightness is used, and the yellow writing content image 22 having high brightness has low brightness after correction. Therefore, a situation in which it is difficult to distinguish the yellow writing content image 22 after correction from the white writing content image 22 after correction may occur.

In a case where the occurrence of such a situation is assumed, the correction unit 13 may further perform correction, for example, after correction by the filter so that the brightness of the yellow writing content image 22 increases.

A situation similar to the situation described above can also occur in the writing content image 22 of a color of a hue other than the yellow hue. Therefore, the correction unit 13 may correct the color of the predetermined hue according to the combination of the type of the writing target image 21 and the background information. Specifically, the correction unit 13 may perform correction so that the brightness of the color of the hue in which the difference in brightness from the background color of the output image 25 is equal to or less than a predetermined value among the colors of the writing content image 22 changes more than those of the colors of other hues. Specifically, in a case where a difference in brightness corresponding to 10% or less of the difference between the minimum brightness and the maximum brightness occurs in the relationship between the color brightness of the writing content image 22 after correction and the color brightness of the background, the correction unit 13 may correct the brightness of the writing content image 22 so that the difference in brightness is 20% or more. For example, in a case where the minimum brightness is 0 and the maximum brightness is 255, when the difference in brightness is 25 or less, the correction unit 13 may correct the brightness of the writing content image 22 so that the difference in brightness is 51 or more.

Figure 10:
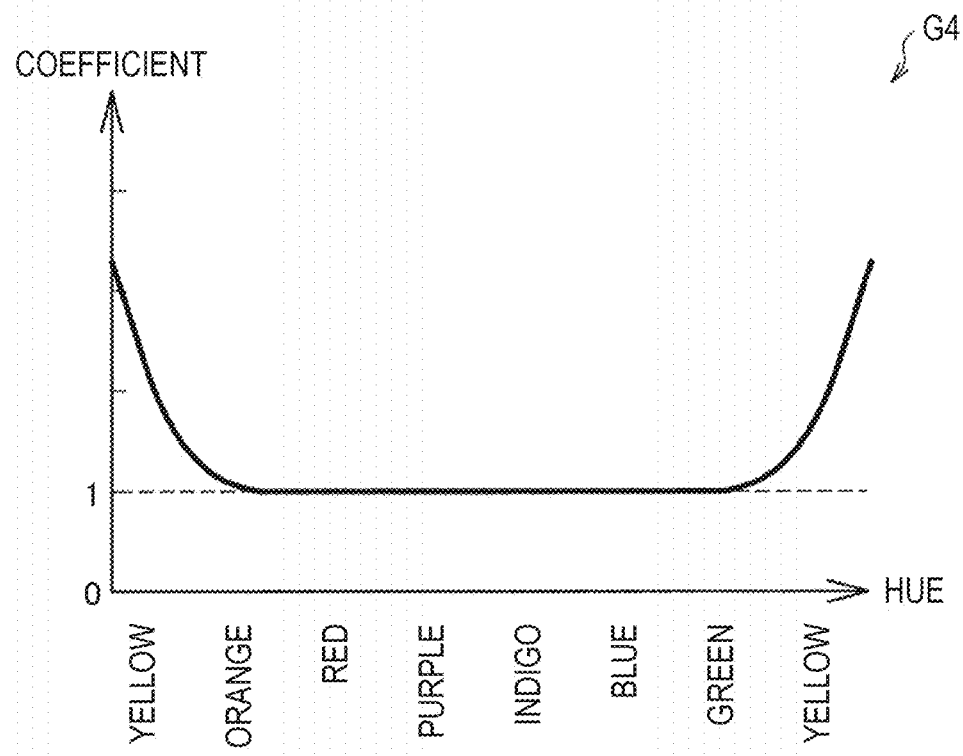
FIG. 10 is a diagram for explaining an example of correction by a quadratic curve in hue corresponding to a hue angle of 50 degrees to 70 degrees by the correction unit 13 according to the embodiment.

In the correction according to the difference in brightness, the correction unit 13 may change the output of the brightness corresponding to the predetermined hue in the correction using the filter according to the combination of the type of the writing target image 21 and the background information. Hereinafter, an example will be described with reference to FIG. 10. FIG. 10 is a diagram for explaining an example of correction by a quadratic curve in hue corresponding to a hue angle of 50 degrees to 70 degrees by the correction unit 13 according to the present embodiment. FIG. 10 illustrates a graph G4. In the graph G4, the value of the coefficient corresponding to each hue is illustrated. Here, the coefficient is the coefficient γ in Equations (1) and (2). In FIG. 10, an example of the correction in hue corresponding to the hue angle of 50 degrees to 70 degrees is described, but of course, the similar correction may be performed for hue in another range.

Note that, in the above description, the correction of the brightness according to the difference in brightness from the color of the background of the output image 25 is described, but, in another way, the similar brightness correction may be performed in consideration of the influence of the illumination on the writing content 4. For example, in a case where the writing content 4 is illuminated by the lighting fixture, the writing content image 22 corresponding to the writing content 4 can appear in a color different from the original color of the writing content 4 in a color of a predetermined hue due to the influence of illumination. In a case where the correction unit 13 corrects the color of the writing content image 22 having a color different from the original color, a situation in which differentiation due to a difference in color as originally intended by the writer 3 is not performed may occur. Therefore, in a case where the occurrence of the situation is expected or the like, the correction unit 13 may correct the brightness of the color of a predetermined hue and emphasize the difference between the writing content image 22 of the color of the corrected hue and the writing content image 22 of another color.

In this manner, the correction unit 13 can appropriately output the writing content image 22 according to the type of the writing target image 21. According to such a function, it is possible to enhance the visibility of the writing content image 22 in the output image 25 and cancel the influence of the illumination related to the writing target image 21.

Figure 11:
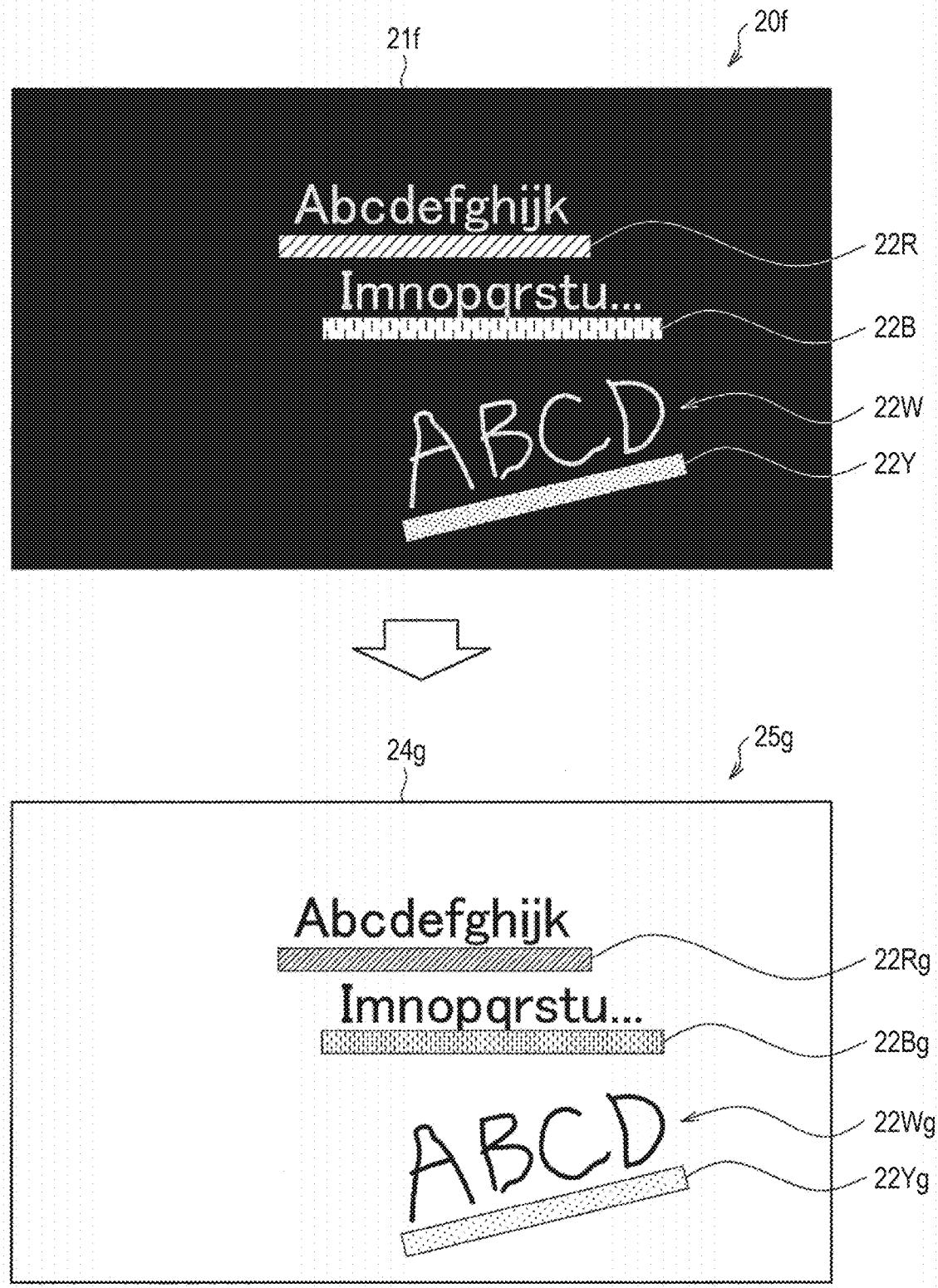
FIG. 11 is a diagram for explaining a specific example of execution of correction processing using a filter by the correction unit 13 according to the embodiment.

Next, a specific example of execution of the correction processing using the filter by the correction unit 13 described above will be described with reference to FIG. 11. FIG. 11 is a diagram for explaining a specific example of execution of correction processing using a filter by the correction unit 13.

On the upper side of FIG. 11, a captured image 20*f* after the extraction processing by the extraction unit 12 is illustrated. The captured image 20*f* includes a writing target image 21*f*, and white characters 22W, a line 22R of a color R, a line 22B of a color B, and a line 22Y of a color Y as the writing content image 22*f*. Here, the type of the writing target image 21 is a blackboard. The correction unit 13 corrects the captured image 20*f* to generate an output image 25*g* in which the background color is white. For example, color R is red, color B is blue, and color Y is yellow.

On the lower side of FIG. 11, the output image 25*g* corrected by the correction unit 13 is illustrated. The output image 25*g* includes a white background image 24*g*, corrected black characters 22Wg, a line 22Rg of the corrected color R, a line 22Bg of the corrected color B, and a line 22Yg of the corrected color Y. Here, the line 22Rg of the color R, the line 22Bg of the color B, and the line 22Yg of the color Y are obtained by correcting the brightness of the line 22R of the color R, the line 22B of the color B, and the line 22Y of the color Y, respectively.

In this manner, it is possible to correct the writing content image 22 so as to enhance the visibility according to the color of the background of the output image 25.

Note that the target for the determination and the correction of the filter is not limited to the above-described example. For example, in the above description, the filter that converts the color of the writing content image 22 is determined on the basis of the type of the writing target 2 and the color of the background of the output image 25, but, in another way, for example, the filter may be determined for each partial portion of the captured image 20.

Figure 12:
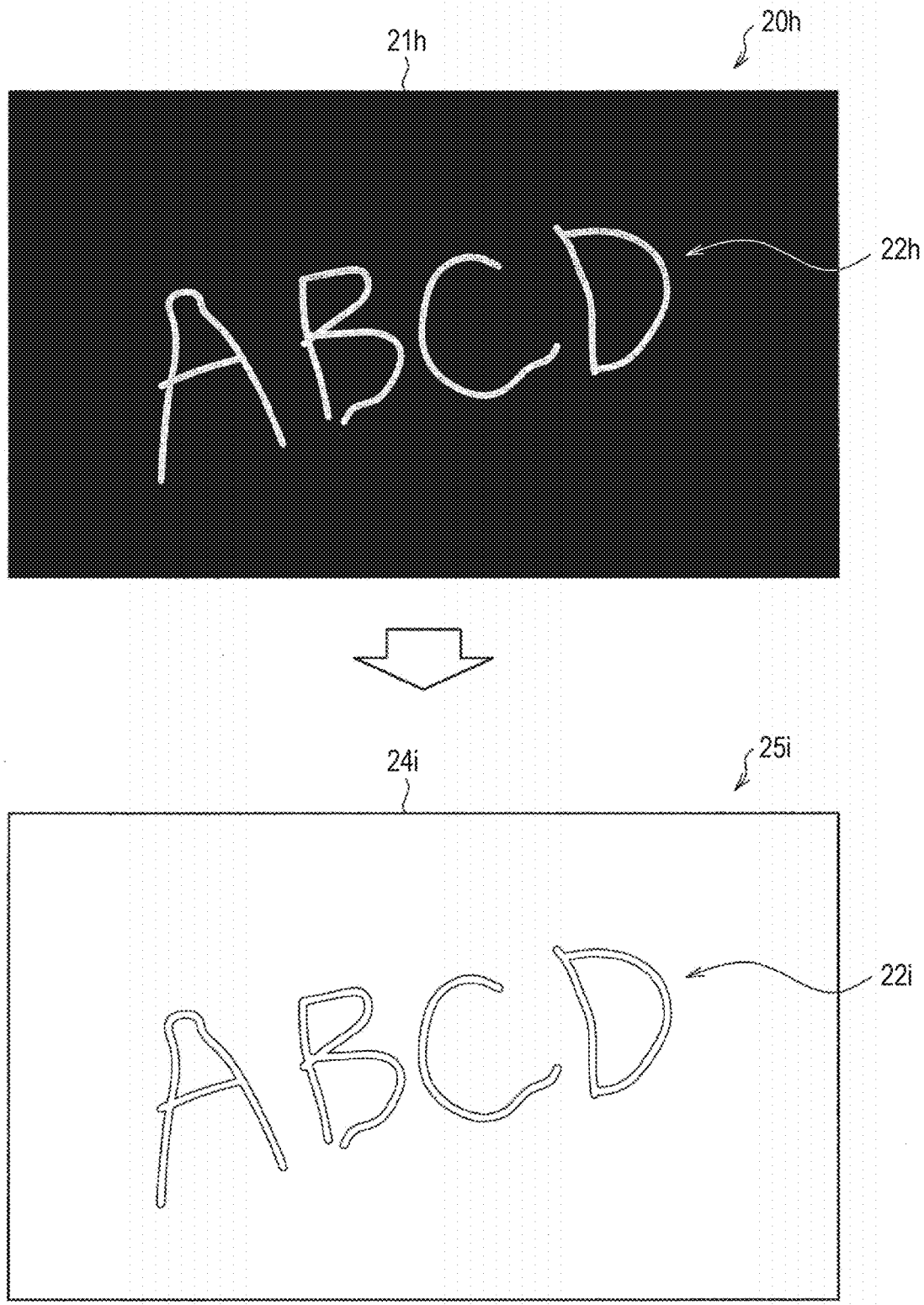
FIG. 12 is a diagram for explaining an example related to the correction processing of the contour of a writing content image 22 by the correction unit 13 according to the embodiment.

In addition, the correction unit 13 may correct the contour of the writing content image 22 in addition to the correction of the color of the writing content image 22. The correction of the contour of the writing content image 22 refers to, for example, processing of emphasizing the contour of the writing content image 22 and erasing a portion other than the contour of the writing content image 22 or the like. Hereinafter, an example of the correction processing of the contour of the writing content image 22 by the correction unit 13 will be described with reference to FIG. 12. FIG. 12 is a diagram for explaining an example related to the correction processing of the contour of the writing content image 22 by the correction unit 13 according to the present embodiment.

On the upper side of FIG. 12, a captured image 20h after the extraction processing by the extraction unit 13 is illustrated. The captured image 20h includes a writing target image 21h and a writing content image 22h. Here, the correction unit 13 may correct the contour of the writing content image 22h. On the lower side of FIG. 12, an output image 25i including a writing content image 22i corrected by the correction unit 13 is illustrated. The output image 25i includes a background image 24i. The writing content image 22i is obtained by correcting the color and the contour of the writing content image 22h.

Note that the correction unit 13 may correct the contour of part of the writing content image 22 and may not correct the contour of the other part of the writing content image 22. For example, after executing saturation and brightness correction processing using the filter, the correction unit 13 may correct the contour of the writing content image 22 of the color of the predetermined hue in the writing content image 22 after the execution of the correction processing, and may not correct the contour of the writing content image 22 of the color other than that of the predetermined hue. In addition, for example, the correction unit 13 may correct the contour of the writing content image 22 recognized as a character by character recognition or the like in the writing content image 22. The target for which the correction of the contour by the correction unit 13 is executed is not limited to such an example.

In this manner, the correction unit 13 can perform correction so as to emphasize the contour of the writing content image 22. According to such a function, it is possible to express that the writing content image 22 the contour of which is corrected has a meaning different from the other writing content images 22.

1-3-2-4. Output Unit 14

The output unit 14 perform control to output the output image 25 including the writing content image 22 corrected by the correction unit 13. Specifically, the output unit 14 generates the output image 25 by superimposing the writing content image 22 the form of which has been corrected by the correction unit 13 on the background image. As a mere example of such a background image, the output unit 14 can generate the output image 25 by superimposing the writing content image 22 whose form has been corrected by the correction unit 13 on the writing target image 21 of the captured image 20. Note that the background image may be an image of any color designated by user setting or the like. The output image 25 generated in this manner is output by the output device 300 described later. The output unit 14 may cause the output device 300 to be described later to output the output image 25 in real time. In addition, the output unit 14 may accumulate the output image 25 in a buffer or a storage (not illustrated) and cause the output device 300 to output the accumulated output image 25 at any timing.

1-3-2-5. A Side View of Problem of Color Correction

As a side view, there is an aspect in which the visibility of the writing content image 22 is enhanced in the output image 25 in a case where the color of the writing content image 22 is corrected by the correction unit 13.

While having such an aspect, saturation and brightness of the writing content image 22 are emphasized in the color correction by the correction unit 13. Therefore, there is an aspect in which not only the color of the writing content 4 included in the writing content image 22 but also the color of the writing target 2 is emphasized due to the color correction. For example, in a case where the writing target 2 is a blackboard, thin spots or the like of the choke occurs in the writing content when writing is performed with the choke or the like. Therefore, in the writing content image 22, not only the color of the choke but also the color of the plate face of the blackboard at a portion corresponding to the thin spots of the choke is reflected.

Figure 13:
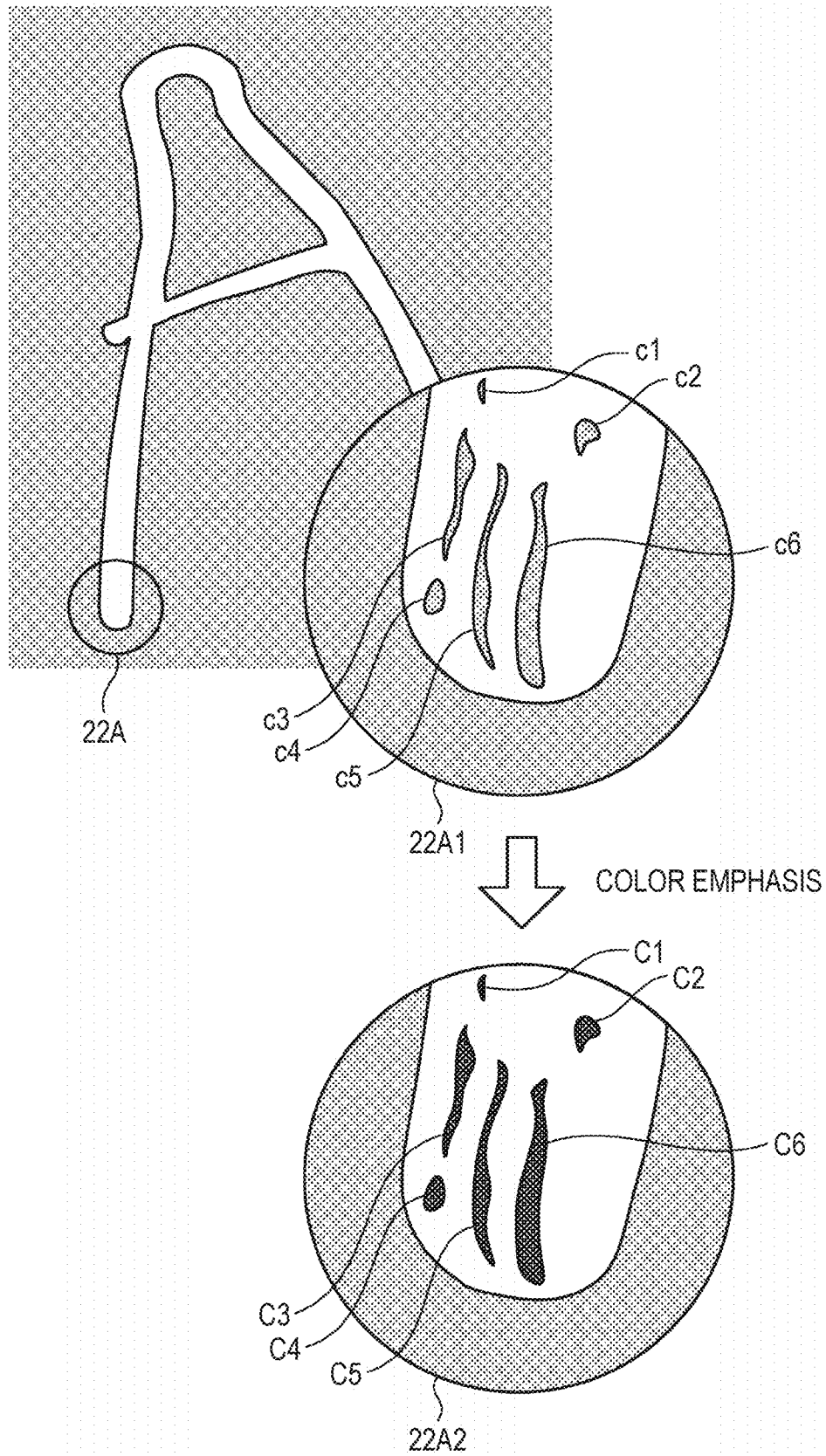
FIG. 13 is a diagram illustrating an example of thin spots of a writing content 4.

FIG. 13 is a diagram illustrating an example of thin spots of the writing content 4. As an example, FIG. 13 illustrates an example in which writing is performed with white chalk on a blackboard which is an example of the writing target 2. Furthermore, FIG. 13 illustrates the character "A" as an excerpt in the character string "ABCD" as an example of the writing content 4 in which writing is performed with the white choke. Furthermore, in FIG. 13, a lower left end portion of the character "A" and its surroundings 22A are further extracted and enlarged, and an enlarged view thereof is indicated by a reference numeral 22A1. Note that, in FIG. 13, the color of the blackboard is indicated by hatching, and the color of the chalk is indicated by white.

As indicated by the reference numeral 22A1 in FIG. 13, part of the writing content 4 may include thin spots c1 to c6 of the choke in addition to the choke with which the lower left end of the character "A" is written. In the writing content image 22 including the thin spots c1 to c6 of the choke, color emphasis is performed not only on saturation and brightness of the choke but also on the thin spots c1 to c6 of the choke. As a result, as indicated by the reference numeral 22A2 in FIG. 13, the thin spots c1 to c6 of the chalk, that is, saturation and brightness of green corresponding to the plate face of the blackboard are emphasized as the thin spots C1 to C6 of the chalk. As described above, the thin spots C1 to C6 of the choke in which saturation and brightness are emphasized hinders, as one factor, the visibility of the writing content 4. For example, as a result that the contour of the character "A" appears unclear due to the effect that the thin spots C1 to C6 of the choke located inside the character "A" become clear, the character "A" appears to be the color of the blackboard, for example, green, or blurred, or dull.

Here, although FIG. 13 illustrates an example in which the writing target 2 is a blackboard as a mere example, even in a case where the writing target 2 is a whiteboard, thin spots or unevenness of the ink of the marker may occur, and thus the visibility of the writing content 4 may be hindered similarly. Furthermore, in a case where the writing target 2 is a whiteboard, the discomfort may further increase due to the fact that the white balance of the imaging device used for imaging is not correctly set. For example, in a case where the whiteboard is imaged in a yellowish state, there is a case where the writing content 4 appears yellowish.

1-3-2-6. A Side View of Approach to Problem Solution

Therefore, in the embodiment of the present disclosure, the color information of the output image 25 generated from the writing content image 22 is determined on the basis of the color information of the writing target 2 detected from the captured image 20. As a side view, the embodiment of the present disclosure has a color emphasis suppression function of suppressing emphasis of saturation or brightness of a writing content pixel having a color corresponding to the vicinity of the color of the writing target 2 among the writing content pixels which are the pixels included in the writing content image 22.

As a mere example, the coefficient used for emphasizing saturation or brightness, of the writing content pixel, near the statistical value of the hue of the writing target 2, for example, the average value is determined to be a coefficient smaller than the coefficient used for emphasizing saturation or brightness, of the writing content pixel, not near the statistical value of the hue of the writing target 2.

Figure 14:
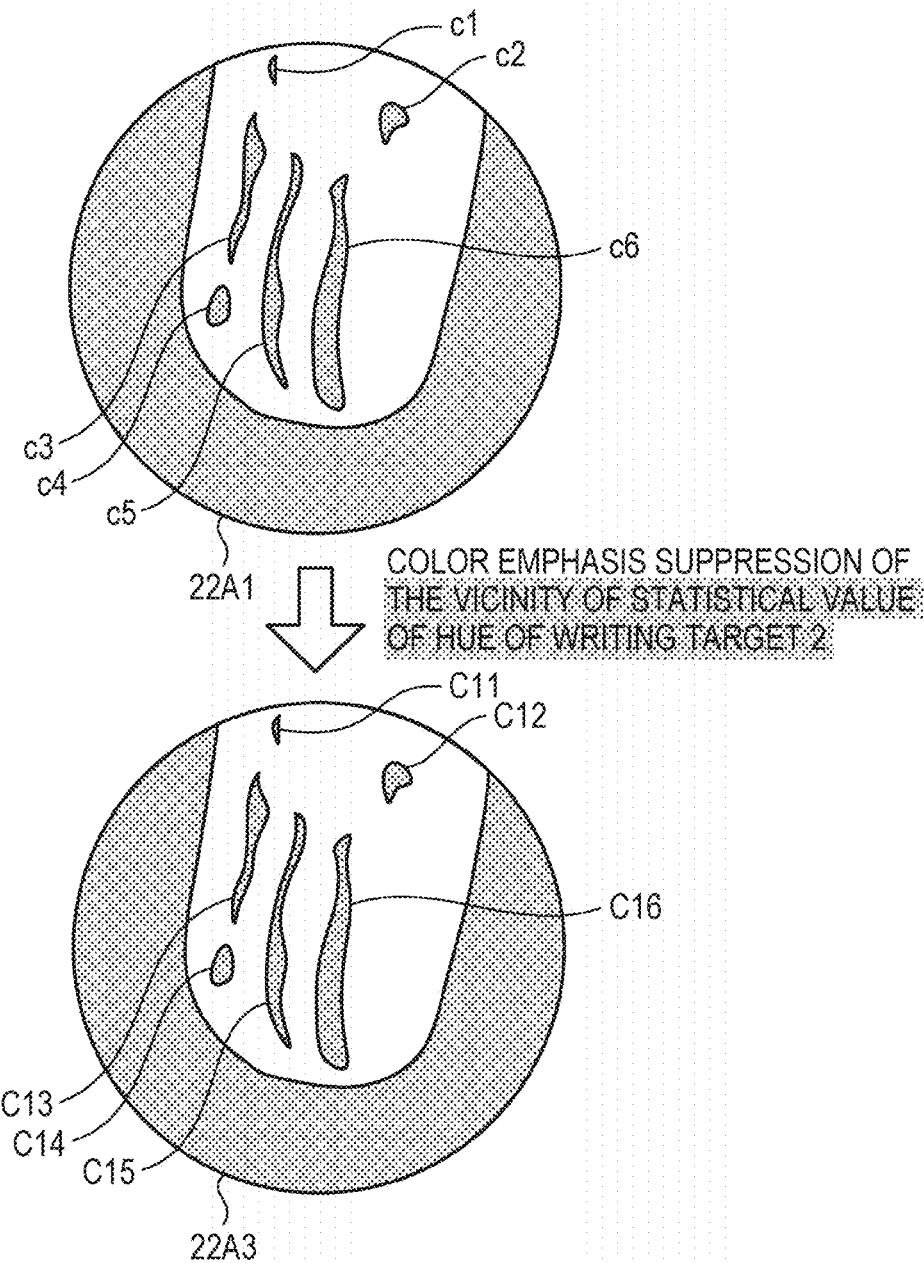
FIG. 14 is a diagram illustrating an example of a method of suppressing color emphasis.

FIG. 14 is a diagram illustrating an example of a method of suppressing color emphasis. FIG. 14 illustrates the enlarged view 22A1 illustrated in FIG. 13, and a color emphasis result, as a reference numeral 22A3, in a case where the color emphasis suppression function according to the embodiment of the present disclosure is applied. In a case where the color emphasis suppression function according to the embodiment of the present disclosure is applied, as illustrated in FIG. 14, saturation or brightness of the choke is emphasized, while the emphasis of saturation or brightness of the thin spots c1 to c6 of the choke corresponding to the vicinity of the color of the writing target 2 is suppressed. Therefore, as indicated by the reference numeral 22A3 in FIG. 14, the thin spots C11 to C16 of the choke in which emphasis of saturation and brightness is suppressed suppress deterioration in visibility of the writing content 4. For example, as a result of suppressing the blurring of the contour of the character "A", it is possible to prevent the character "A" from appearing to be the color of the blackboard, for example, green, or blurred, or dull.

Therefore, according to the color emphasis suppression function according to the embodiment of the present disclosure, it is possible to suppress deterioration in visibility of the writing content 4 due to color emphasis.

Hereinafter, functional units that implement the color emphasis suppression function according to the embodiment of the present disclosure, for example, the detection unit 15 and the determination unit 16 will be described.

1-3-2-7. Detection Unit 15

The detection unit 15 detects the color information of the writing target 2 from the writing target image 21. As an embodiment, processing in a case where the writing target 2 is a blackboard will be described as an example. In this case, the writing content 4 is likely to have a lighter color than the writing target 2. Therefore, the detection unit 15 applies, to the writing target image 21, a filter that replaces the pixel value of a pixel to be processed, for example, a hue, saturation, and brightness with the pixel value of the peripheral pixel having brightness of a minimum value among the peripheral pixels located within the predetermined range from the pixel to be processed. As a mere example, each of the pixels included in the writing target image 21 is set as a pixel to be filter processed in the similar order as raster scan or the like. In addition, the range of peripheral pixels whose pixel values are to be replaced may be any range. For example, four adjacent pixels or eight adjacent pixels left, right, upper, and lower of a pixel to be processed may be included in the peripheral pixels, or pixels located up to a predetermined number of pixels starting from a pixel to be processed may be included in the peripheral pixels. By applying such a filter to the writing target image 21, as a side view, the pixel value of the pixel having a color darker than a color corresponding to the choke or the like, for example, white or yellow, for example, the color of the plate face of the blackboard, is extracted by the filter and replaced with the pixel value of a pixel to be processed. As a result, a writing target image 21 in which the writing content 4 has been removed from the writing target image 21 is obtained. Then, the detection unit 15 calculates a statistical value, for example, an average value, a mode value, a median value, or the like, of pixels included in the writing target image 21 from which the writing content 4 has been removed. As a result, the color information of the writing target 2 is detected.

Note that, here, as a mere example, the filter that replaces the pixel value of a pixel to be processed with a pixel value of the peripheral pixel having brightness of a minimum value among the peripheral pixels located within the predetermined range from the pixel to be processed has been exemplified, but other filters can be applied to the captured image 20. For example, a filter that replaces the pixel value of a pixel to be processed with the statistical value of the pixel values of the peripheral pixels having the brightness of a mode value among the peripheral pixels located within the predetermined range from the pixel to be processed may be applied to the writing target image 21.

In addition, here, a case where the writing target 2 is a blackboard is described as a mere example, but the color information of the writing target 2 can be similarly detected even in a case where the writing target 2 is other than the blackboard. As another example, in a case where the writing target 2 is the whiteboard, a filter that replaces a pixel value of a pixel to be processed with the pixel value of the peripheral pixel having brightness of a maximum value among the peripheral pixels located within a predetermined range from the pixel to be processed is only required to be applied to the writing target image 21.

1-3-2-8. Determination Unit 16

The determination unit 16 determines a color emphasis suppression coefficient to be multiplied by a coefficient used for the correction unit 13 to color emphasize the writing content image 22 by on the basis of the color information of the writing target 2 detected by the detection unit 15. Hereinafter, from a side view of distinguishing the label from the color emphasis suppression coefficient, the coefficient used for the correction unit 13 to emphasize saturation or brightness of the writing content pixel is referred to as a "color emphasis coefficient".

For example, the determination unit 16 sets the color emphasis suppression coefficient to be multiplied by the color emphasis coefficient of the writing content pixel having the hue near the statistical value of the hue of the writing target 2 to a value smaller than the color emphasis suppression coefficient of the writing content pixel having the hue not near the statistical value of the hue of the writing target 2. In this manner, by multiplying the color emphasis coefficient of the writing content pixel having the hue near the statistical value of the hue of the writing target 2 by the color emphasis suppression coefficient of a small value, the color emphasis on the writing content pixel having the hue near the statistical value of the hue of the writing target 2 is suppressed.

More specifically, the determination unit 16 can set a function in which the correspondence relationship between the hue and the color emphasis suppression coefficient is defined on the basis of the color information of the writing target 2 detected by the detection unit 15.

Figure 15:
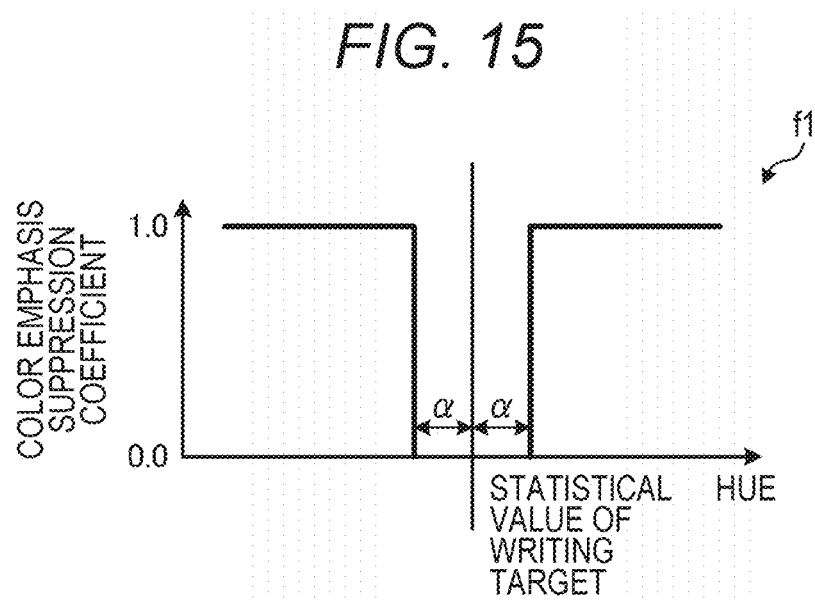
FIG. 15 is a diagram illustrating an example of a function.
Figure 16:
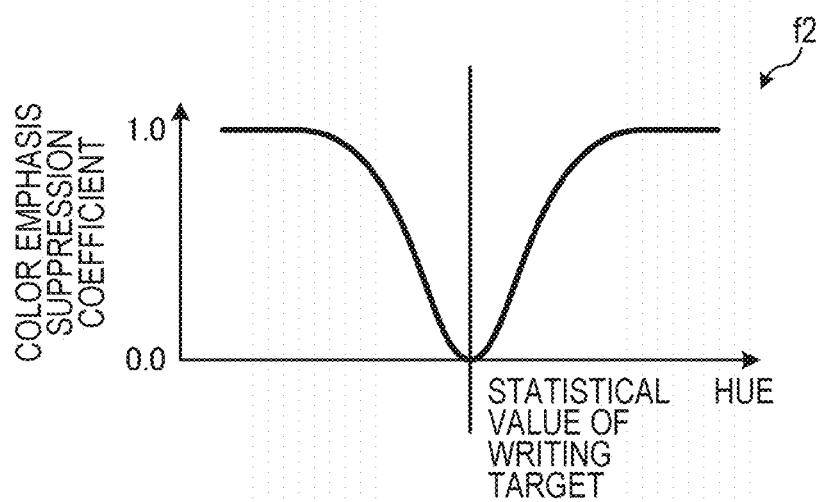
FIG. 16 is a diagram illustrating an example of a function.
Figure 17:
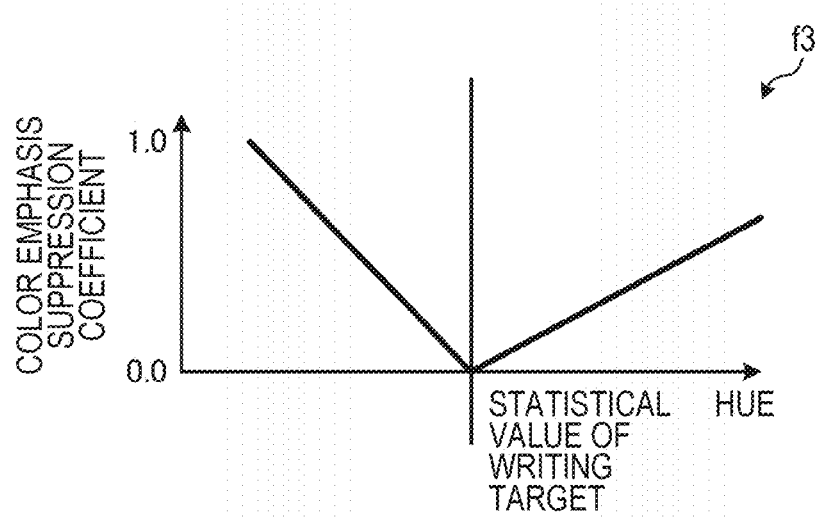
FIG. 17 is a diagram illustrating an example of a function.

FIGS. 15 to 17 are diagrams illustrating examples of functions. FIG. 15 illustrates an example in which a function f1 in which a value of the color emphasis suppression coefficient corresponding to the hue within a predetermined range, for example, within $\pm\alpha$ from the statistical value of the hue of the writing target 2 is set to 0 and a value of the color emphasis suppression coefficient corresponding to the hue outside the range is set to 1 is set.

In addition, FIG. 16 illustrates an example in which a function f2 in which a value of the color emphasis suppression coefficient monotonously nonlinearly increases as the hue is away from the statistical value of the hue of the writing target 2 is set. For example, in the function f2, the minimum value of the color emphasis suppression coefficient can be set to be small to 0, and the maximum value of the color emphasis suppression coefficient can be set to be large up to 1. Note that although FIG. 16 illustrates the function f2 in which the value of the color emphasis suppression coefficient monotonously nonlinearly increases, a function in which the value of the color emphasis suppression coefficient linearly increases can be set as the function f2.

Furthermore, FIG. 17 illustrates an example in which a function f3 in which an increment of the color emphasis suppression coefficient corresponding to an increase in hue and an increment of the color emphasis suppression coefficient corresponding to a decrease in hue are different from each other in two directions that are away from each other from a statistical value of hues of the writing target 2, where the two directions includes a direction in which a hue increases and a direction in which a hue decreases. Furthermore, in the function f3, an increment of the monotonous increase in the color emphasis suppression coefficient corresponding to a decrease in hue in a direction in which a hue increases is set to be larger than an increment of the monotonous increase in the color emphasis suppression coefficient corresponding to an increase in hue in a direction in which a hue decreases.

The magnitude relationship of the increment of the monotonous increase in the color emphasis suppression coefficient between the two directions including a direction in which a hue increases and a direction in which a hue decreases can be set according to the visual characteristics. As a mere example, the visual characteristics include an aspect in which skin color sensitivity is high while blue color sensitivity is low as compared with other colors. From this, an increment of the monotonous increase in the color emphasis suppression coefficient corresponding to one direction, of two directions including a direction in which a hue increases and a direction in which a hue decreases, in which the hue corresponding to the skin color is included can be set to be smaller than an increment of the monotonous increase in the color emphasis suppression coefficient corresponding to the other direction. Alternatively, an increment of the monotonous increase in the color emphasis suppression coefficient corresponding to one direction, of two directions including a direction in which a hue increases and a direction in which a hue decreases, in which the hue corresponding to blue is included can be set to be larger than an increment of the monotonous increase in the color emphasis suppression coefficient corresponding to the other direction.

Note that although FIG. 17 illustrates an example in which the color emphasis suppression coefficient linearly increases, the color emphasis suppression coefficient may be nonlinearly increased. Furthermore, an increment of a monotonous increase in the color emphasis suppression coefficient corresponding to one direction, of two directions including a direction in which a hue increases and a direction in which a hue decreases, in which a hue corresponding to the skin color is included is set to be larger than an increment of a monotonous increase in the color emphasis suppression coefficient corresponding to the other direction. Alternatively, an increment of a monotonous increase in the color emphasis suppression coefficient corresponding to one direction, of two directions including a direction in which a hue increases and a direction in which a hue decreases, in which a hue corresponding to blue is included is set to be smaller than an increment of a monotonous increase in the color emphasis suppression coefficient corresponding to the other direction.

In addition, in FIGS. 15 to 17, the function that determines the correspondence relationship between the hue and the color emphasis suppression coefficient has been exemplified, but the color emphasis suppression coefficient may not necessarily be determined according to the function. For example, it goes without saying that a look-up table or the like in which a correspondence relationship between the hue and the color emphasis suppression coefficient is defined can be used instead of the function.

According to the functions f1 to f3, the color emphasis suppression coefficient corresponding to the hue of the writing content pixel is determined for each writing content pixel. By multiplying the color correction coefficient, that is, the above-described "γ" by the color emphasis suppression coefficient determined for each writing content pixel in this manner, it is possible to incorporate the above-described color emphasis suppression function into the color emphasis by the correction unit 13.

According to these functions f1 to f3, a value smaller than the color emphasis suppression coefficient of the writing content pixel having the hue not near the statistical value of the hue of the writing target 2 can be set to the color emphasis suppression coefficient of the writing content pixel having the hue near the statistical value of the hue of the writing target 2. Furthermore, according to the function f2 and the function f3, since the increment of the monotonous increase in the color emphasis suppression coefficient corresponding to a direction in which a hue increases and a direction in which a hue decreases with the statistical value of the hue of the writing target 2 as a starting point is smoother than that of the function f1, the flicker phenomenon that appears with steep intensity of color emphasis can be suppressed. Furthermore, according to the function f3, the increment of the monotonous increase in the color emphasis suppression coefficient in a direction in which the hue with low sensitivity of the eye decreases or a direction in which the hue with low sensitivity of the eye increases is set to be large, or the increment of the monotonous increase in the color emphasis suppression coefficient in a direction in which the hue with high sensitivity of the eye decreases or a direction in which the hue with high sensitivity of the eye is set to be low, as compared with the functions f1 and f2, so that the flicker phenomenon that appears with rapid intensity of color emphasis can be more effectively suppressed.

Note that, here, as a mere example, an example is described in which the color emphasis suppression coefficient is determined according to the hue, but the color emphasis suppression coefficient may be determined using at least one of saturation or brightness.

1-3-3. Output Device 300

The output device 300 is a device that outputs information under the control of the image processing apparatus 100. The output device 300 is realized by a display device such as a CRT display device, a liquid crystal display device, a plasma display device, an EL display device, a laser projector, an LED projector, and a lamp.

The output device 300 receives the output image 25 from the output unit 14 to output the output image 25. The output device 300 may output the output image 25 as a moving image in a stream format. In other words, the output device 300 may output the output image 25 in real time.

The output device 300 may output the output image 25 at the timing of receiving the output image 25 from the output unit 14. On the other hand, the output device 300 may store the output image 25 received from the output unit 14 to output it at a later timing. Note that the output device 300 may receive the output image 25 stored in an internal or external buffer or storage of the image processing apparatus 100 to output the output image 25 as a still image or a moving image.

Figure 18:
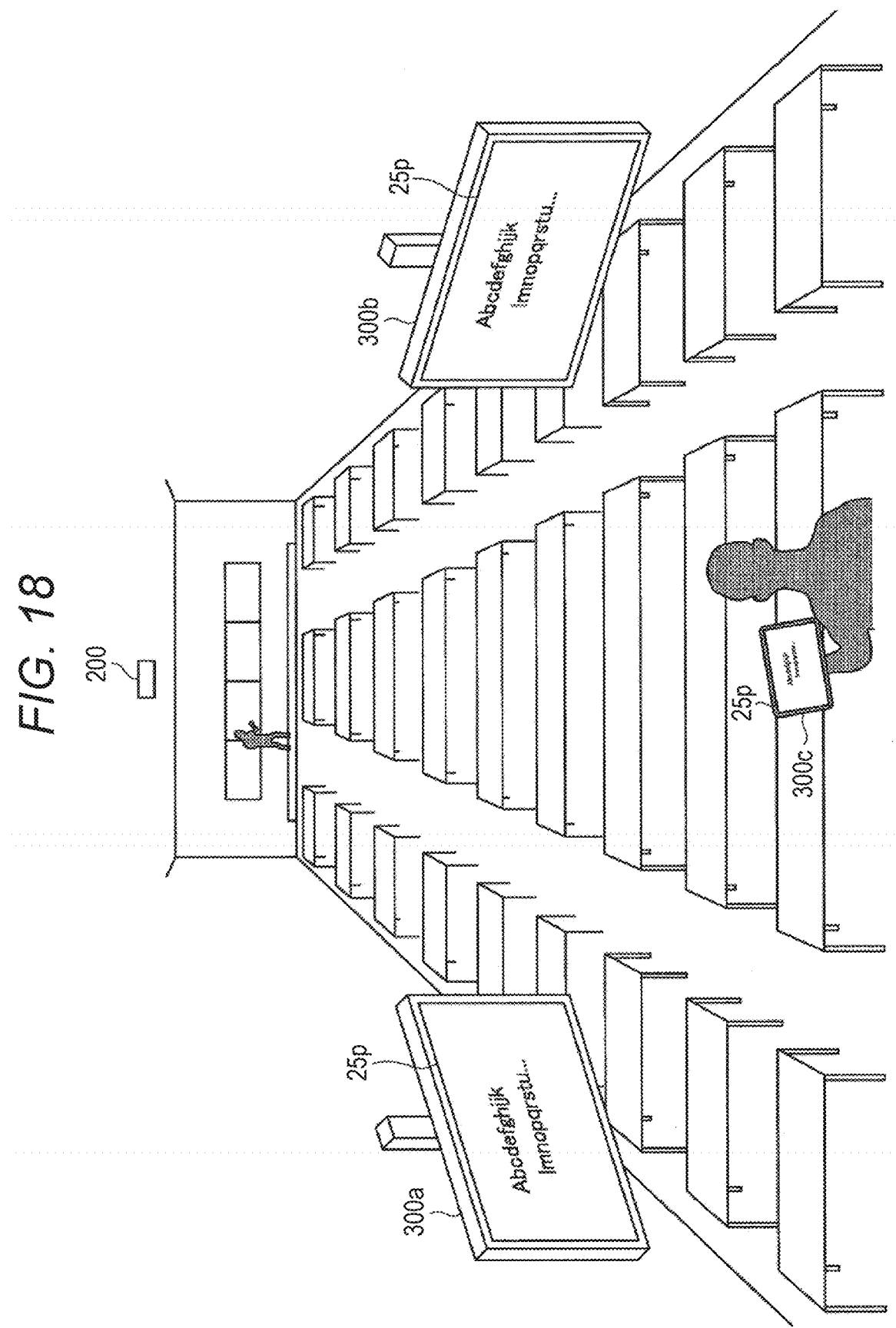
FIG. 18 is a diagram for explaining an example of output by an output device 300 according to the present embodiment.

As described above, the output device 300 is realized by various display devices. The output device 300 may include a plurality of display devices. Here, a specific example of the output device 300 will be described with reference to FIG. 18. FIG. 18 is a diagram for explaining an example of output by the output device 300 according to the present embodiment. FIG. 18 illustrates the input device 200 and the output devices 300a, 300b, and 300c.

As illustrated in FIG. 18, the output device 300 may be a display device such as output devices 300a and 300b. The output device 300 may be a tablet terminal such as an output device 300c. The output devices 300a, 300b, and 300c each output an output image 25p. Note that, like the output device 300c, another terminal may be connected to the image processing apparatus 100 to access the output image 25p. Of course, the output of the output image 25 by the output device 300 is not limited to the above example.

In this way, by outputting the output image 25 by various display devices, it is possible to confirm the output image 25 according to the individual situation.

2. OPERATION EXAMPLE

Figure 19:
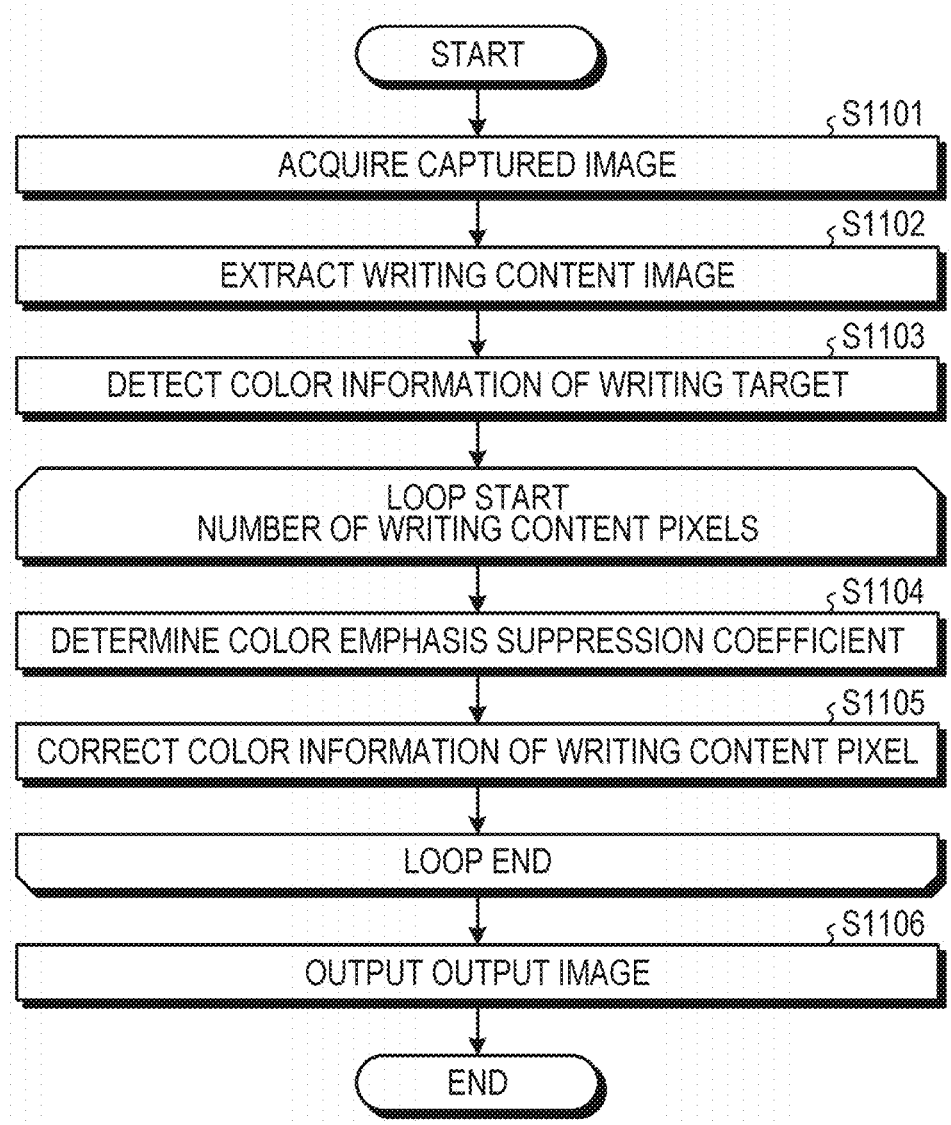
FIG. 19 is a diagram for explaining an example of a flow of operation of the system 1 according to the present embodiment.

Next, an example of a flow of operation of the system 1 according to the present embodiment will be described. FIG. 19 is a diagram for explaining an example of the flow of the operation of the system 1 according to the present embodiment. As a mere example, the processing illustrated in FIG. 19 can be started in a case where the captured image 20 is acquired.

As illustrated in FIG. 19, the acquisition unit 11 acquires the captured image 20 in which the writing target image 21 is captured by the input device 200 (S1101). Subsequently, the extraction unit 12 extracts the writing content image 22 from the captured image 20 (step S1102). In addition, the detection unit 15 detects the color information of the writing target 2 from the captured image 20 (step S1103).

Thereafter, the determination unit 16 and the correction unit 13 repeat the following step S1104 and the following step 31105 by the number of times corresponding to the number of writing content pixels which are pixels included in the writing content image 22 extracted in step S1102.

That is, the determination unit 16 determines the color emphasis suppression coefficient to be multiplied by the coefficient used for the correction unit 13 to color emphasize the writing content image 22 on the basis of the color information of the writing target 2 detected in step S1103 (step S1104). Then, the correction unit 13 executes the correction according to the color emphasis coefficient obtained by multiplying the color emphasis count used for color correction among the forms of the writing content image 22 by the color emphasis suppression coefficient determined in step S1104 (step S1105).

Thereafter, the output unit 14 generates the output image 25 in which the writing content image 22 the form of which has been corrected by the correction unit 13 is superimposed on the writing target image 21 of the captured image 20 to output it to the output device 300 (step S1106), and ends the processing.

Note that the execution order of steps S1102 and S1103 illustrated in FIG. 19 is not limited to the illustrated example. For example, the processing in step S1103 can be executed before the processing in step S1102, or the processing in steps S1102 and S1103 can be executed in parallel.

3. APPLICATION EXAMPLE

The above-described embodiments are examples, and various applications are possible.

3-1. Application Example 1

In the above-described embodiment, as a mere example, an example of calculating the statistical value of the pixels included in the writing target image 21 from which the writing content 4 has been removed by applying the filter to the captured image 20 is described, but the method of detecting the color information of the writing target 2 is not limited thereto. As another example, the detection unit 15 can detect the color information of the writing target 2 by calculating the statistical value of the remaining pixels by excluding pixels corresponding to the writing content image extracted by the extraction unit 12 among the pixels included in the writing target image 21.

3-2. Application Example 2

In the above-described embodiment, as a mere example, an example in which the color emphasis suppression coefficient of the writing content pixel is determined on the basis of the color information of the writing target 2 detected from the entire writing target image 21 is described, but the present invention is not limited thereto.

Figure 20:
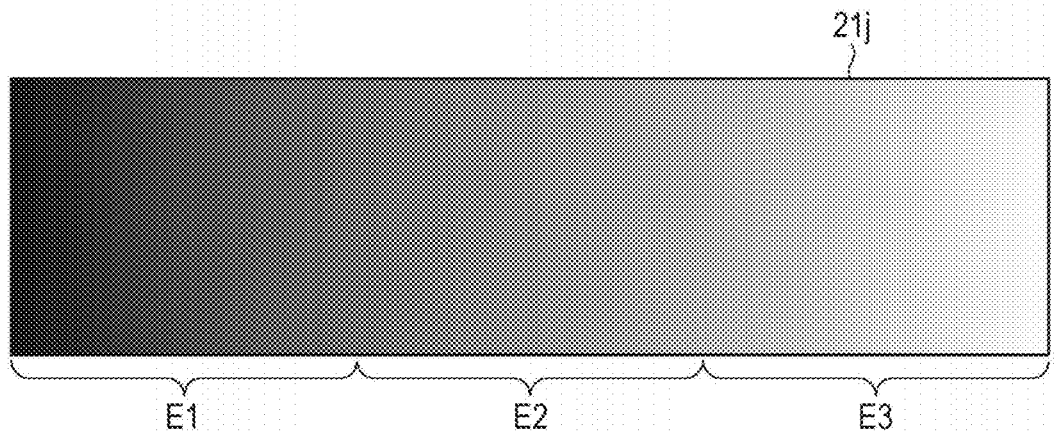
FIG. 20 is a diagram illustrating an example of area division in Application Example 2.

FIG. 20 is a diagram illustrating an example of area division in Application Example 2. FIG. 20 illustrates an example in which a writing target image 21j is divided into three areas E1 to E3 as an example. In this case, the detection unit 15 detects the color information of the writing target 2 for each of the areas E1 to E3 by calculating the statistical value of the hue of the pixels other than writing content pixels among the pixels included in each of the areas E1 to E3 of the writing target image 21j. Then, the determination unit 16 can set a function of determining the color emphasis suppression coefficient of the writing content pixel belonging to each of the areas E1 to E3 of the writing target image 21j. As a result, the influence of thin spots of the writing content 4 and the influence of sunlight or illumination can be reduced.

Here, FIG. 20 illustrates an example in which the writing target image 21j is divided into three areas of the areas E1 to E3, but the area division method is not limited thereto. For example, as the size of the writing target 2 increases, the influence of thin spots of the writing content 4 remarkably appears in the writing content image, and the influence of sunlight and illumination also increases. From this, the pixel density of the writing target 2 per unit area can be calculated from the writing target image 21, and the number of divisions can be set according to the pixel density. For example, a smaller number of divisions can be set as the pixel density of the writing target 2 per unit area increases, or a larger number of divisions can be set as the pixel density of the writing target 2 per unit area decreases. Note that although FIG. 20 illustrates an example in which the writing target image 21j is divided into the left and right parts, the writing target image can be divided into the upper and lower parts or divided into the upper, lower, left, and right parts.

3-3. Application Example 3

Figure 21:
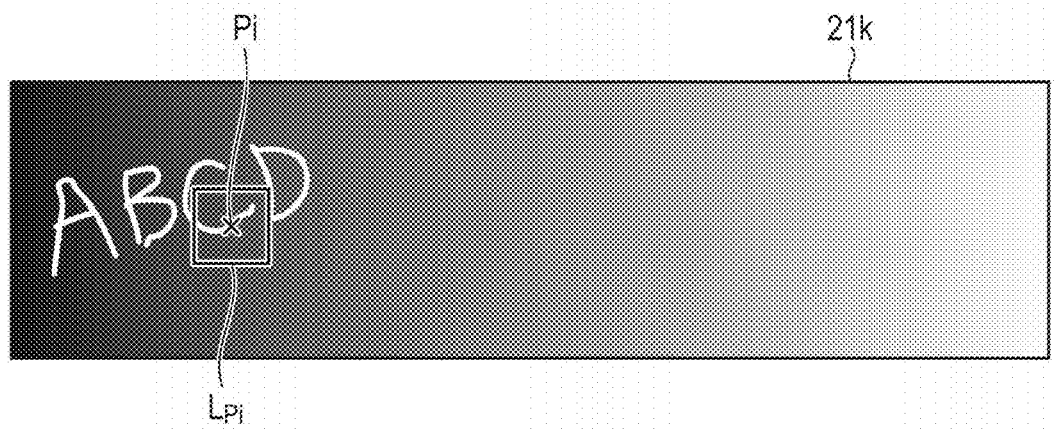
FIG. 21 is a diagram illustrating an example of a local region in Application Example 3.

Following the Application Example 2 described above, the detection unit 15 can set a different function for each writing content pixel on the basis of the statistical value of the hues of the local region including the writing content pixel and the peripheral pixels therefor. FIG. 21 is a diagram illustrating an example of a local region in Application Example 3. As an example, FIG. 21 illustrates an example in which writing is performed with white chalk on a blackboard which is an example of the writing target 2. Furthermore, FIG. 21 illustrates a character string "ABCD" as an example of the writing content 4 in which writing is performed with the white choke. In the example illustrated in FIG. 21, the statistical value of the hue of a local region LPi of the predetermined size including the writing content pixel Pi and the peripheral pixels therefor is calculated for the writing content pixel Pi corresponding to the character string "ABCD". On the basis of the statistical value of the hue of the local region LPi calculated in this manner, the determination unit 16 sets a function of determining the color emphasis suppression coefficient of the writing content pixel Pi. As a result, even in a case where sunlight or illumination is applied differently at various places of the writing target 2, it is possible to suppress color emphasis of the background of the writing target 2 corresponding to the thin spots of the choke or the marker.

Figure 22:
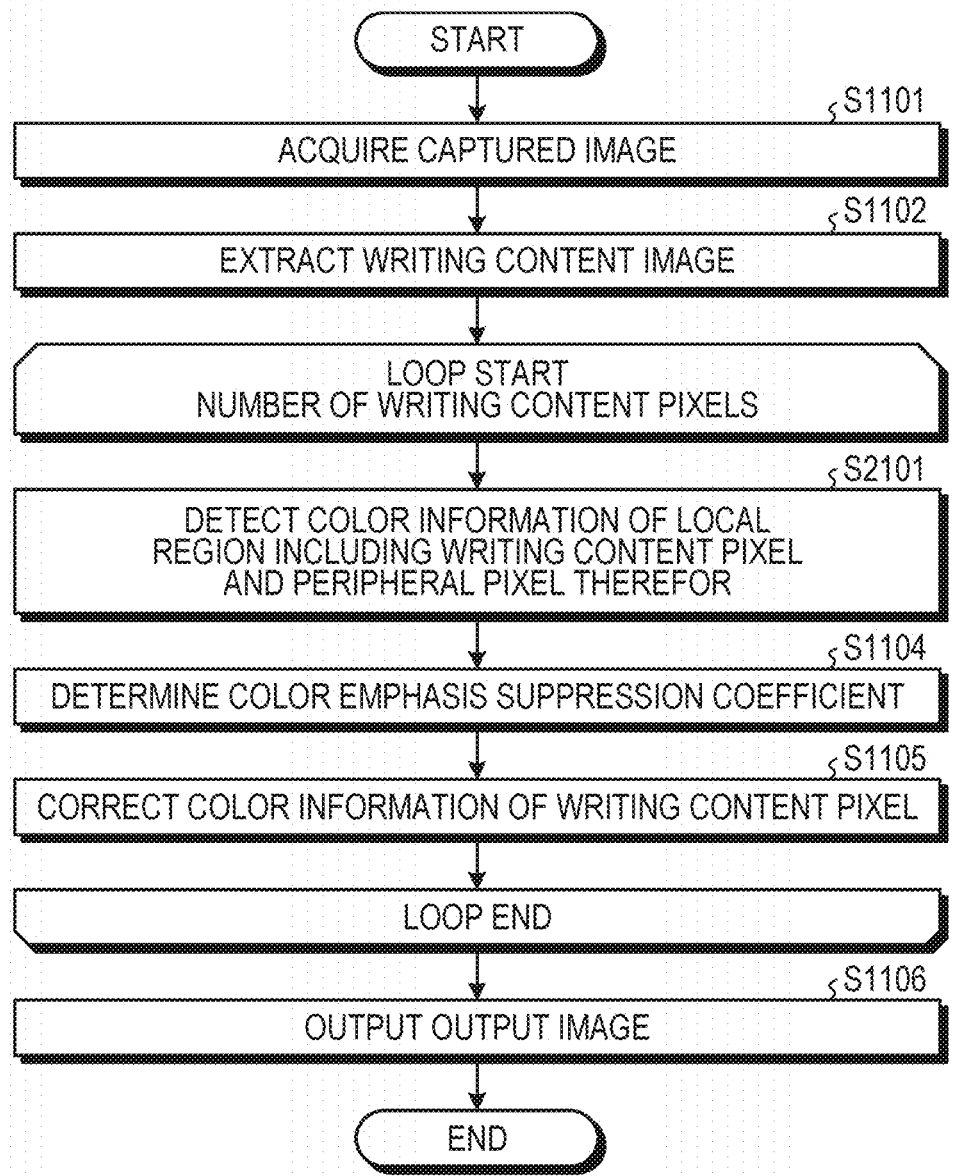
FIG. 22 is a diagram for explaining an example of a flow of operation of the system 1 according to Application Example 3.

FIG. 22 is a diagram for explaining an example of a flow of operation of the system 1 according to Application Example 3. The process illustrated in FIG. 22 can also be started in a case where the captured image 20 is acquired, as in the process illustrated in FIG. 19.

As illustrated in FIG. 22, the acquisition unit 11 acquires the captured image 20 in which the writing target image 21 is captured by the input device 200 (S1101). Subsequently, the extraction unit 12 extracts the writing content image 22 from the captured image 20 (step S1102).

Thereafter, the detection unit 15, the determination unit 16, and the correction unit 13 repeat the following step S1102 to the following step S1103 by the number of times corresponding to the number of writing content pixels which are pixels included in the writing content image 22 extracted in step S1105.

That is, the detection unit 15 detects the color information of the local region including the writing content pixel and the peripheral pixels therefor (step S2101). Then, the determination unit 16 determines a color emphasis suppression coefficient to be multiplied by the coefficient used for the correction unit 13 to color emphasize the writing content image 22 on the basis of the color information of the local region detected in step S2101 (step S1104). Then, the correction unit 13 executes the correction according to the color emphasis coefficient obtained by multiplying the color emphasis count used for color correction among the forms of the writing content image 22 by the color emphasis suppression coefficient determined in step S1104 (step S1105).

Thereafter, the output unit 14 generates the output image 25 in which the writing content image 22 the form of which has been corrected by the correction unit 13 is superimposed on the writing target image 21 of the captured image 20 to output it to the output device 300 (step S1106), and ends the processing.

3-4. Application Example 4

In the above-described embodiment, the color emphasis suppression function of suppressing the color emphasis of the writing content image 22 included in the output image 25 on the basis of the color information of the writing target 2 is described as a mere example, but a background determination function of determining the color information of the background image on which the writing content image 22 is superimposed on the basis of the color information of the writing target 2 may be installed. Note that it goes without saying that each of the color emphasis suppression function and the background determination function can be executed individually or in combination.

Figure 23:
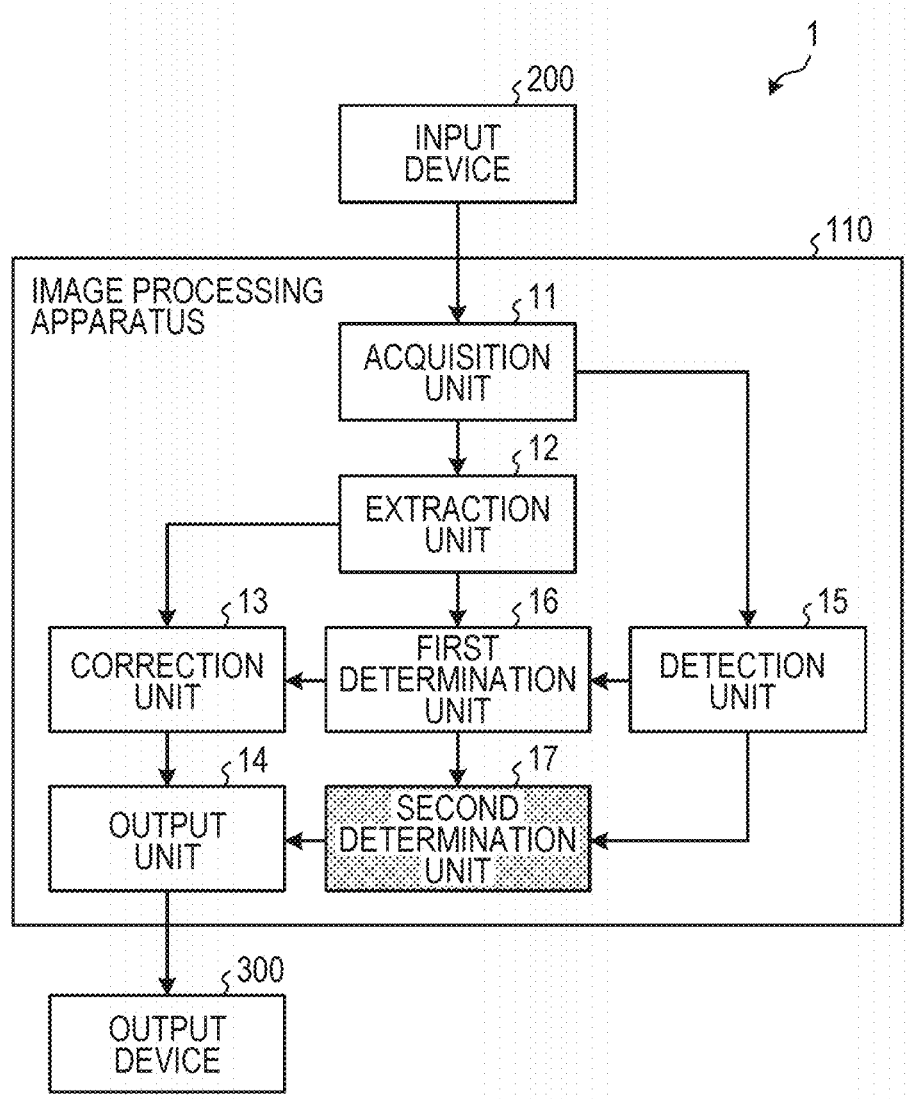
FIG. 23 is a diagram for explaining an example of a functional configuration of a system 1 according to Application Example 4.

FIG. 23 is a diagram for explaining an example of a functional configuration of a system 1 according to Application Example 4. FIG. 23 illustrates a functional configuration example in a case where the color emphasis suppression function and the background determination function are implemented in combination. An image processing apparatus 110 illustrated in FIG. 23 is different from the image processing apparatus 100 illustrated in FIG. 2 in that it includes a first determination unit 16 and a second determination unit 17.

Among these, the first determination unit 16 has a function similar to that of the determination unit 16 illustrated in FIG. 2. In addition, the second determination unit 17 determines the color information of the background image on which the writing content image 22 is superimposed on the basis of the color information of the writing target 2. As a mere example, the second determination unit 17 determines a color corresponding to the statistical value of the hue of the writing target 2 as the color of the background image. In addition, in a case where the statistical value of the hue of the writing target 2 corresponds to the color of the blackboard, the second determination unit 17 can also determine the color of the blackboard, for example, "black", "deep green", or the like, as the color of the background image. In addition, in a case where the statistical value of the hue of the writing target 2 corresponds to the color of the whiteboard, the second determination unit 17 can also determine the color of the whiteboard, for example, "white" or the like, as the color of the background image.

3-5. Application Example 5

Figure 24:
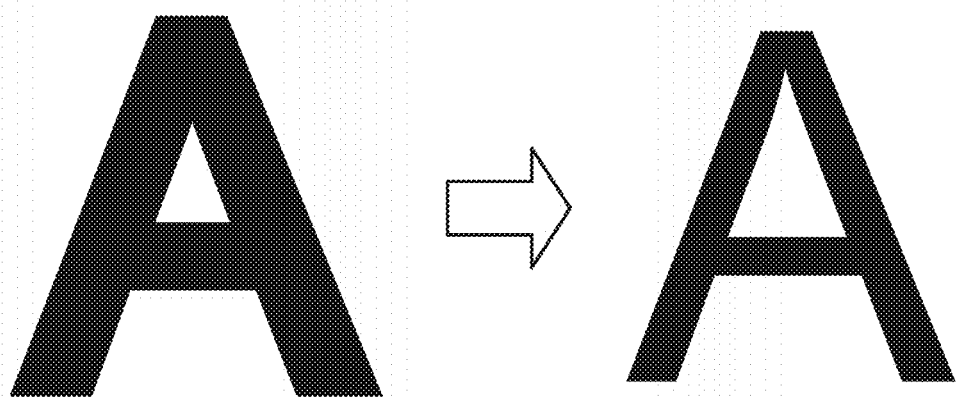
FIG. 24 is a diagram illustrating an example of degeneration of a writing content pixel according to Application Example 5.

In the above-described embodiment, as a mere example, an example in which the color emphasis is performed on all the writing content pixels is described, but the color emphasis may not necessarily be performed on all the writing content pixels. FIG. 24 is a diagram illustrating an example of the degeneration of the writing content pixel according to Application Example 5. In FIG. 24, as a mere example, a character "A" is illustrated as an example of the writing content 4. For example, as shown in FIG. 24, by applying a morphology filter to the character "A", the character "A" can be degenerated to a slightly thinner character "A". The degenerated writing content pixel obtained in this way may correspond to the portion of the writing lead. Then, the determination of the color emphasis suppression coefficient and the color emphasis based on the color emphasis suppression coefficient can be executed by narrowing down to the writing content pixel that does not correspond to the degenerated writing content pixel among the writing content pixels.

3-6. Application Example 6

As described above, the correction unit 13 corrects the writing content image 22 on the basis of the information about the writing target image 21 and the color of the background of the output image 25. In addition, the correction unit 13 may correct the writing content image 22 on the basis of the state of the writer detected from the captured image 20. Hereinafter, the correction processing based on the state of the writer by the correction unit 13 will be described.

First, the state of the writer may be motion information of the writer. The correction unit 13 may correct the form of the writing content image 22 further on the basis of the motion information of the writer. Here, the motion information refers to, for example, action detection information or the like indicating whether or not the writer is performing writing on the writing target image 21. At this time, it may be detected from the captured image 20 that the writer is performing writing on the writing target image 21.

Note that the motion of the writer is detected by performing the action recognition of the writer. Specifically, by executing the action recognition in each frame of the still image or the moving image, the timing at which the writer has executed the motion can be captured.

Hereinafter, correction processing, by the correction unit 13, based on the action detection information indicating whether or not the writer is performing writing on the writing target image 21 will be described with reference to FIGS. 25 and 26. FIGS. 25 and 26 are diagrams for explaining an example of correction processing based on action detection information indicating whether or not the writer is writing on the writing target image 21 by the correction unit 13 according to the present embodiment.

In a case where the writer who is not performing writing on the writing target image 21 is detected, the correction unit 13 corrects the color of the writing content image 22 on the basis of the combination of the type of the writing target 2 and the background color of the output image 25 as described above. On the other hand, in a case where the writer who is performing writing on the writing target 2 is detected, it performs correction different from that in the case where the writer who is not performing writing on the writing target 2 is detected on the writing target image 21.

FIG. 25 illustrates a captured image 20$j$ acquired by the acquisition unit 11. The captured image 20$j$ includes a writer image 23$j$ indicating that the writer is not performing writing on the writing target image 21$j$. In addition, FIG. 25 illustrates an output image 25$k$. In the output image 25$k$, a background image 24$k$ and a corrected writing content image 22$k$ are illustrated. Note that, in an example of FIG. 25, the writing content image 22$k$ is similar to a writing content image 22$j$.

FIG. 26 illustrates a captured image 20$l$ acquired by the acquisition unit 11. The captured image 20$l$ includes a writing target image 21$l$, the writing content image 22$j$, and a writer image 23$l$. Here, the writer image 23$l$ is an image of the writer who is performing writing.

Here, the correction unit 13 detects that the writer 3 is performing writing, and corrects the color and the width of the writing content image 22$j$. FIG. 26 illustrates an output image 25$m$. The output image 25$m$ includes a background image 24$m$ and a corrected writing content image 22$m$. Here, the writing content image 22$m$ changes in color, compared with the writing content image 22$j$, and has a wider width than the writing content image 22$j$.

As illustrated in FIGS. 25 and 26, for example, the correction unit 13 may correct the writing content image 22 so that a person viewing the output image 25 can understand that the writer 3 is performing writing when the writer 3 is performing writing.

Note that, in the above, with reference to FIGS. 25 and 26, an example is described in which the correction unit 13 performs correction to widen (distend) the width of the writing content image 22 in a case where a detection unit 12 detects that the writer 3 is performing writing. However, on the other hand, in a case where the detection unit 12 detects that the writer 3 is performing writing, the correction unit 13 may perform processing of narrowing (reducing) the width of the writing content image 22, or may perform correction of the contour of the writing content image 22, for example, correction of hollowing the writing content image 22 and leaving only the contour portion.

In this way, it is sufficient to grasp the writing content image 22 only by confirming the still image or the moving image in the state where the writing is completed. According to such a function, it is possible to save the viewer's trouble in a case where it is desired to confirm the writing content image 22 later or the like.

3-7. Application Example 7

In addition, the information related to the state of the writer 3 may be positional relationship information indicating a positional relationship between the writer 3 and the writing target image 21. The correction unit 15 may correct the writing content image 22 further on the basis of the positional relationship information. Here, the positional relationship between the writer 3 and the writing target image 21 refers to the position of the writer 3 with respect to the writing target image 21, and the like. The positional relationship information may include the time corresponding to the positional relationship between the writer 3 and the writing target image 21 and the writing content image 22 corresponding to the positional relationship between the writing content images 22.

Note that acquisition of the positional relationship information is realized by the system 1 including a distance measuring device. Here, the distance measuring device is a device that includes, for example, a distance measuring sensor and is capable of acquiring a distance between the distance measuring sensor and an object.

Figure 27:
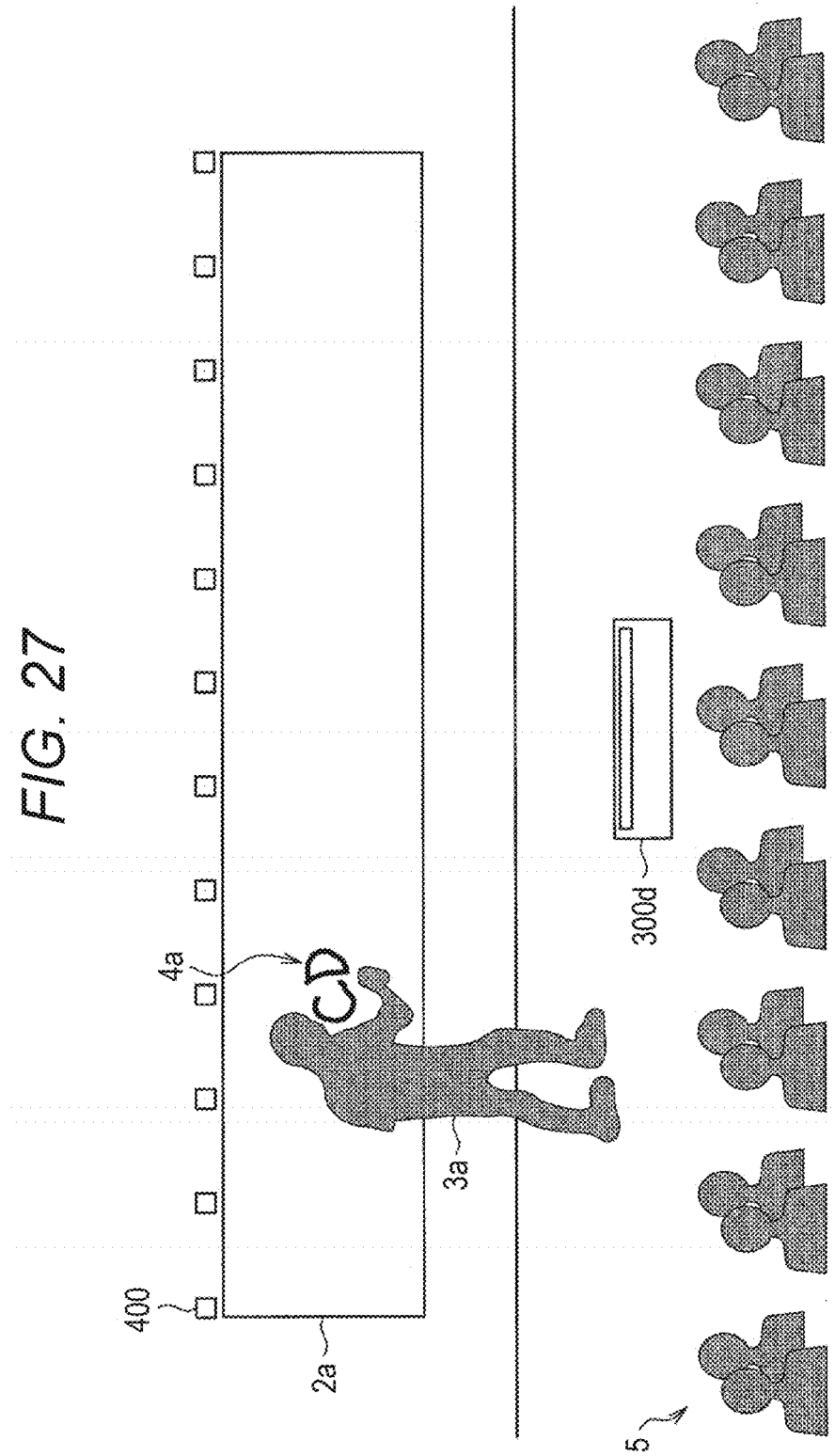
FIG. 27 is a diagram for explaining correction processing of the writing content image based on the positional relationship between a writer 3 and a writing target 2 by a correction unit 15 according to the embodiment.

Hereinafter, the correction processing, by the correction unit 15, of the writing content image 22 based on the positional relationship between the writer 3 and the writing target image 21 will be described with reference to FIG. 27. FIG. 27 is a diagram for explaining correction processing, by the correction unit 15, of the writing content image 22 based on the positional relationship between the writer 3 and the writing target image 21 according to the present embodiment.

FIG. 27 illustrates a state of a lecture. FIG. 27 illustrates a writing target 2a, a writer 3a, part 4a of the writing content, students 5, an output device 300, and a plurality of distance measuring devices 400. The output image 25 output by the output device 300 may be installed so as to be visible only to the writer 3. Here, the writer 3 stands at a place where the writing content 4 is hidden. Therefore, only part 4a of the writing content is visible to the students 5. Here, the correction unit 15 may correct the color of the writing content image 22 on the basis of the positional relationship between the writer 3 and the writing target image 21.

An example of FIG. 27 will be described. The plurality of distance measuring devices 400 acquires the distance between each distance measuring device 400 and the writer 3. At this time, the position of the writer with respect to the writing target image 21 is detected.

Here, in a case where the position of the writer detected from the writing target image 21 is a position where the writing content image 22 is hidden for a predetermined time, the correction unit 15 may correct the writing content image 22 so as to notify the writer 3 that the writing content image 22 is hidden.

Specifically, in a case where it is indicated as the positional relationship information that the change in the positional relationship between the writer 3 and the writing content image 22 is equal to or less than a predetermined amount for a predetermined time, the correction unit 15 may correct the writing content image 22 corresponding to the positional relationship. For example, in a case where the change in the position of the writer 3 is equal to or less than a predetermined amount for a predetermined time, the correction unit 15 may correct, to a predetermined color, the color of the writing content image 22, for example, the color of the hidden writing content image 22 or the color of the vicinity of the hidden writing content image 22 so as to notify the writer 3 that the writing content image 22 existing at the position of the writing target 2 close to the position of the writer 3 is hidden.

In the case of the example of FIG. 27, the correction unit 15 corrects the color of a writing content 4a or the writing content image 22 hidden by the writer 3 to a predetermined color in a case where the change in the position of the writer 3 is equal to or less than a predetermined amount for a predetermined time. In the case of the example of FIG. 27, the corrected writing content image 22 is output by the output device 300 and is notified to the writer 3.

In this manner, it is possible to notify the writer that the students cannot see the writing content image 22 because the writing content image 22 is hidden. According to such a function, the writer can act so that the students can receive a more comfortable lecture.

Note that the information indicating the positional relationship between the writer 3 and the writing target 2 may be acquired using an imaging device other than the distance measuring device 400. As the imaging device, for example, the input device 200 may be used. In addition, in a case where the writing target 2 is the electronic blackboard, the writing target 2 may directly output the output image 25.

4. Hardware Configuration Example

Figure 28:
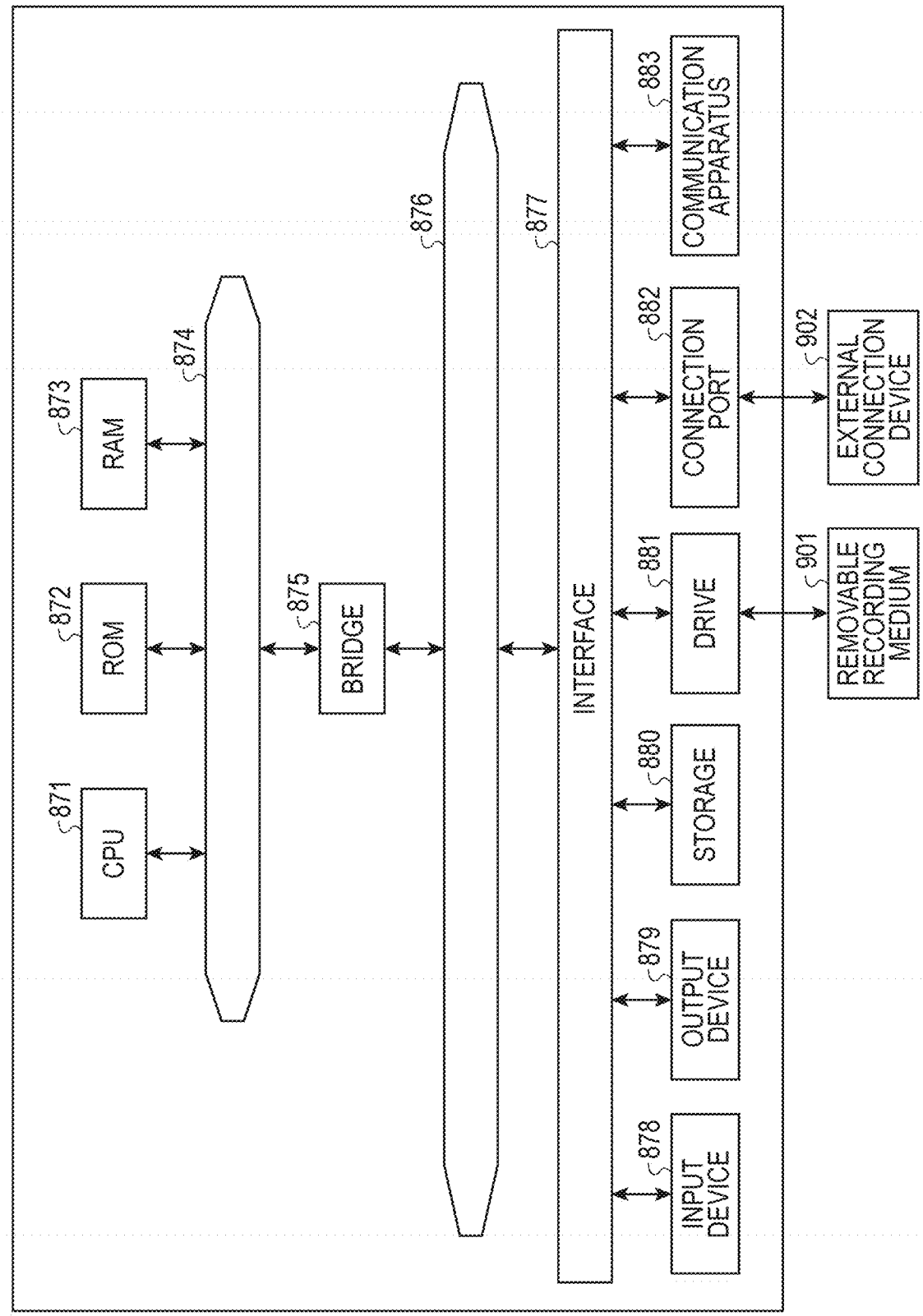
FIG. 28 is a block diagram illustrating a hardware configuration example of an information processing apparatus including a system 1 according to an embodiment of the present disclosure.

Next, a hardware configuration example of the image processing apparatus 100, the input device 200, and the output device 300 according to an embodiment of the present disclosure will be described. FIG. 28 is a block diagram illustrating a hardware configuration example of the image processing apparatus 100, the input device 200, and the output device 300 according to an embodiment of the present disclosure. Referring to FIG. 28, the image processing apparatus 100, the input device 200, and the output device 300 include, for example, a processor 871, a ROM 872, a RAM 873, a host bus 874, a bridge 875, an external bus 876, an interface 877, an input device 878, an output device 879, a storage 880, a drive 881, a connection port 882, and a communication apparatus 883. Note that the hardware configuration illustrated here is an example, and some of the components may be omitted. In addition, components other than the components shown here may be further included.

(Processor 871)

The processor 871 functions as, for example, an arithmetic processing device or a control device, and controls the overall operation of each component or part thereof on the basis of various programs recorded in the ROM 872, the RAM 873, the storage 880, or a removable recording medium 901.

(ROM872, RAM873)

The ROM 872 is a unit that stores a program read by the processor 871, data used for calculation, and the like. The RAM 873 temporarily or permanently stores, for example, a program read by the processor 871, various parameters that appropriately change when the program is executed, and the like.

Note that functions of the acquisition unit 11, the extraction unit 12, the correction unit 13, the output unit 14, the detection unit 15, the determination unit 16, the input device 200, the output device 300, and the like described above are realized by cooperation of the processor 871, the ROM 872, the RAM 873, and software.

(Host Bus 874, Bridge 875, External Bus 876, Interface 877)

The processor 871, the ROM 872, and the RAM 873 are mutually connected via, for example, the host bus 874 capable of high-speed data transmission. On the other hand, the host bus 874 is connected to the external bus 876 having a relatively low data transmission speed via the bridge 875, for example. In addition, the external bus 876 is connected to various components via the interface 877.

(Input Device 878)

As the input device 878, for example, a mouse, a keyboard, a touch panel, a button, a switch, a lever, and the like are used. Furthermore, as the input device 878, a remote controller (hereinafter, remote controller) capable of transmitting a control signal using infrared rays or other radio waves may be used. In addition, the input device 878 includes a voice input device such as a microphone.

(Output Device 879)

The output device 879 is a device capable of visually or audibly notifying the user of acquired information, for example, a display device such as a cathode ray tube (CRT), an LCD, or an organic EL, an audio output device such as a speaker or a headphone, a printer, a mobile phone, a facsimile, or the like. In addition, the output device 879 according to the present disclosure includes various vibration devices capable of outputting tactile stimulation. The function of the output device 879 is realized by the output device 300.

(Storage 880)

The storage 880 is a device for storing various pieces of data. As the storage 880, for example, a magnetic storage device such as a hard disk drive (HDD), a semiconductor storage device, an optical storage device, a magneto-optical storage device, or the like is used.

(Drive 881)

The drive 881 is, for example, a device that reads information recorded on the removable recording medium 901 such as a magnetic disk, an optical disk, a magneto-optical disk, or a semiconductor memory, or writes information to the removable recording medium 901.

(Removable Recording Medium 901)

The removable recording medium 901 is, for example, a DVD medium, a Blu-ray (registered trademark) medium, an HD DVD medium, various semiconductor storage media, or the like. Of course, the removable recording medium 901 may be, for example, an IC card on which a non-contact IC chip is mounted, an electronic device, or the like.

(Connection Port 882)

The connection port 882 is a port for connecting an external connection device 902, for example, a universal serial bus (USB) port, an IEEE 1394 port, a small computer system interface (SCSI), an RS-232C port, an optical audio terminal, or the like.

(External Connection Device 902)

The external connection device 902 is, for example, a printer, a portable music player, a digital camera, a digital video camera, an IC recorder, or the like.

(Communication Apparatus 883)

The communication apparatus 883 is a communication device for connection to a network, and is, for example, a communication card for a wired or wireless LAN, Bluetooth (registered trademark), or wireless USB (WUSB), a router for optical communication, a router for asymmetric digital subscriber line (ADSL), a modem for various communications, or the like. By using the communication apparatus 883, wireless communication with the terminal device as the output device 300 by the image processing apparatus 100 is realized.

5. SUMMARY

The embodiments of the present disclosure are described above with reference to FIGS. 1 to 28. As described above, the image processing apparatus 100 according to the embodiment of the present disclosure determines the color information of the output image 25 generated from the writing content image 22 on the basis of the color information of the writing target 2 detected from the captured image 20. As a side view, the image processing apparatus 100 according to the embodiment of the present disclosure has a color emphasis suppression function of suppressing emphasis of saturation or brightness of a writing content pixel having a color corresponding to the vicinity of the color of the writing target 2 among the writing content pixels which are the pixels included in the writing content image 22. Therefore, according to the image processing apparatus 100 according to the embodiment of the present disclosure, it is possible to suppress deterioration in visibility of the writing content 4 due to color emphasis.

Although the preferred embodiments of the present disclosure have been described in detail with reference to the accompanying drawings, the technical scope of the present disclosure is not limited to such examples. It is obvious that a person having ordinary knowledge in the technical field of the present disclosure can conceive various changes or modifications within the scope of the technical idea described in the claims, and it is naturally understood that these also belong to the technical scope of the present disclosure.

In addition, the effects described in the present specification are merely illustrative or exemplary, and are not restrictive. That is, the technology according to the present disclosure can exhibit other effects obvious to those skilled in the art from the description of the present specification together with or instead of the above effects.

In addition, the processing described using the flowchart and the sequence diagram in the present specification may not necessarily be executed in the illustrated order. Some processing steps may be performed in parallel. In addition, additional processing steps may be employed, and some processing steps may be omitted.

Note that the present technology can also have the following configurations.

(1) An image processing apparatus including
a determination unit configured to determine, on the basis of color information of a detected writing target, color information of an output image generated from a writing content image that is an image of a writing content written on the writing target.

(2) The image processing apparatus according to the (1), in which
the color information of the writing target is a statistical value of pixels included in a writing target image in which the writing content is removed, by applying a predetermined filter to a writing target image that is an image of the writing target, from the writing target image.

(3) The image processing apparatus according to the (2), in which
the filter replaces a pixel value of a pixel to be processed with a pixel value of a peripheral pixel having brightness of a minimum value among peripheral pixels located within a predetermined range from the pixel to be processed.

(4) The image processing apparatus according to the (2), in which
the filter replaces a pixel value of a pixel to be processed with a statistical value of pixel values of peripheral pixels having brightness of a mode value among peripheral pixels located within a predetermined range from the pixel to be processed.

(5) The image processing apparatus according to the (2), in which
the filter replaces a pixel value of a pixel to be processed with a pixel value of a peripheral pixel having brightness of a maximum value among peripheral pixels located within a predetermined range from the pixel to be processed.

(6) The image processing apparatus according to the (1), in which
  the color information of the writing target is a statistical value of pixels other than a pixel corresponding to the writing content image among pixels included in a writing target image that is an image of the writing target.
(7) The image processing apparatus according to any one of the (1) to the (6), in which
  the color information of the writing target is detected for each area of the writing target.
(8) The image processing apparatus according to the (1), in which
  the color information of the writing target is detected, on the basis of a statistical value of hues of a local region including a writing content pixel that is a pixel included in the writing content image and peripheral pixels for the writing content pixel, for each of the writing content pixels.
(9) The image processing apparatus according to any one of the (1) to the (8), in which
  the determination unit determines a color emphasis suppression coefficient to be multiplied by a color emphasis coefficient of a writing content pixel that is a pixel included in the writing content image on the basis of the color information of the writing target.
(10) The image processing apparatus according to the (9), in which
  the determination unit sets a color emphasis suppression coefficient to be multiplied by a color emphasis coefficient of a writing content pixel having a hue near a statistical value of hues of the writing target to be a value smaller than a color emphasis suppression coefficient of a writing content pixel having a hue not near a statistical value of hues of the writing target.
(11) The image processing apparatus according to the (10), in which
  the determination unit determines, for each of the writing content pixels, a color emphasis suppression coefficient corresponding to a hue that the writing content pixel has according to a function in which a value of a color emphasis suppression coefficient corresponding to a hue within a predetermined range from a statistical value of hues of the writing target is set to 0 and a value of a color emphasis suppression coefficient corresponding to a hue outside the range is set to 1.
(12) The image processing apparatus according to the (10), in which
  the determination unit determines, for each of the writing content pixels, a color emphasis suppression coefficient corresponding to a hue that the writing content pixel has according to a function in which a value of a color emphasis suppression coefficient monotonously non-linearly increases as a hue is away from a statistical value of hues of the writing target.
(13) The image processing apparatus according to the (10), in which
  the determination unit determines, for each of the writing content pixels, a color emphasis suppression coefficient corresponding to a hue that the writing content pixel has according to a function in which an increment of a color emphasis suppression coefficient corresponding to an increase in hue and an increment of a color emphasis suppression coefficient corresponding to a decrease in hue are different from each other in two directions that are away from each other from a statistical value of hues of the writing target, the two directions including a direction in which a hue increases and a direction in which a hue decreases.
(14) The image processing apparatus according to the (13), in which
  a magnitude relationship of an increment of a monotonous increase in a color emphasis suppression coefficient between the two directions including the direction in which a hue increases and the direction in which a hue decreases is set according to a visual characteristic.
(15) The image processing apparatus according to the (14), in which
  an increment of a monotonous increase in a color emphasis suppression coefficient corresponding to one direction, of the two directions including the direction in which a hue increases and the direction in which a hue decreases, in which a hue corresponding to a skin color is included is set to be smaller than an increment of a monotonous increase in a color emphasis suppression coefficient corresponding to another direction.
(16) The image processing apparatus according to the (14), in which
  an increment of a monotonous increase in a color emphasis suppression coefficient corresponding to one direction, of the two directions including the direction in which a hue increases and the direction in which a hue decreases, in which a hue corresponding to blue is included is set to be larger than an increment of a monotonous increase in a color emphasis suppression coefficient corresponding to another direction.
(17) The image processing apparatus according to any one of the (1) to the (16), in which
  the determination unit determines color information of a background image on which the writing content image is superimposed on the basis of color information of the writing target.
(18) The image processing apparatus according to the (17), in which
  the determination unit determines a color corresponding to a statistical value of hues of the writing target as a color of the background image.
(19) An image processing method executed by a computer, the method including
  determining, on the basis of color information of a detected writing target, color information of an output image generated from a writing content image that is an image of a writing content written on the writing target.
(20) A program for causing a computer to execute the processing of
  determining, on the basis of color information of a detected writing target, color information of an output image generated from a writing content image that is an image of a writing content written on the writing target.

REFERENCE SIGNS LIST

100 Image processing apparatus
11 Acquisition unit
12 Extraction unit
13 Correction unit
14 Output unit
15 Detection unit
16 Determination unit
200 Input device
300 Output device
400 Distance measuring device

The invention claimed is:

1. An image processing apparatus comprising:
a determination unit configured to determine, based on color information of writing content written on a detected writing target, color information of an output image generated from a writing content image that is an image of the writing content written on the detected writing target,
wherein the determination unit determines, for each writing content pixel of a plurality of writing content pixels, a color emphasis suppression coefficient corresponding to a hue that the writing content pixel has according to a predetermined range from a statistical value of hues of the writing target, and
wherein the determination unit is implemented via at least one processor.

2. The image processing apparatus according to claim 1, wherein the color information of the writing target is a statistical value of pixels included in a writing target image in which the writing content is removed, by applying a predetermined filter to a writing target image that is an image of the writing target, from the writing target image.

3. The image processing apparatus according to claim 2, wherein the filter replaces a pixel value of a pixel to be processed with a pixel value of a peripheral pixel having brightness of a minimum value among peripheral pixels located within a predetermined range from the pixel to be processed.

4. The image processing apparatus according to claim 2, wherein
the filter replaces a pixel value of a pixel to be processed with a statistical value of pixel values of peripheral pixels having brightness of a mode value among peripheral pixels located within a predetermined range from the pixel to be processed.

5. The image processing apparatus according to claim 2, wherein the filter replaces a pixel value of a pixel to be processed with a pixel value of a peripheral pixel having brightness of a maximum value among peripheral pixels located within a predetermined range from the pixel to be processed.

6. The image processing apparatus according to claim 1, wherein the color information of the writing target is a statistical value of pixels other than a pixel corresponding to the writing content image among pixels included in a writing target image that is an image of the writing target.

7. The image processing apparatus according to claim 1, wherein the color information of the writing target is detected for each area of the writing target.

8. The image processing apparatus according to claim 1, wherein the color information of the writing target is detected, based on a statistical value of hues of a local region including a writing content pixel that is a pixel included in the writing content image and peripheral pixels for the writing content pixel, for each of the writing content pixels.

9. The image processing apparatus according to claim 1, wherein the determination unit determines a color emphasis suppression coefficient to be multiplied by a color emphasis coefficient of a writing content pixel that is a pixel included in the writing content image based on the color information of the writing target.

10. The image processing apparatus according to claim 9, wherein the determination unit sets a color emphasis suppression coefficient to be multiplied by a color emphasis coefficient of a writing content pixel having a hue near a statistical value of hues of the writing target to be a value smaller than a color emphasis suppression coefficient of a writing content pixel having a hue not near a statistical value of hues of the writing target.

11. The image processing apparatus according to claim 10, wherein the determination unit determines, for each of the writing content pixels, the color emphasis suppression coefficient corresponding to the hue that the writing content pixel has according to a function in which a value of a color emphasis suppression coefficient corresponding to a hue within the predetermined range from the statistical value of hues of the writing target is set to 0 and a value of a color emphasis suppression coefficient corresponding to a hue outside the range is set to 1.

12. The image processing apparatus according to claim 10, wherein the determination unit determines, for each of the writing content pixels, the color emphasis suppression coefficient corresponding to the hue that the writing content pixel has according to a function in which a value of a color emphasis suppression coefficient monotonously nonlinearly increases as a hue is away from the statistical value of hues of the writing target.

13. The image processing apparatus according to claim 10, wherein the determination unit determines, for each of the writing content pixels, the color emphasis suppression coefficient corresponding to the hue that the writing content pixel has according to a function in which an increment of a color emphasis suppression coefficient corresponding to an increase in hue and an increment of a color emphasis suppression coefficient corresponding to a decrease in hue are different from each other in two directions that are away from each other from a statistical value of hues of the writing target, the two directions including a direction in which a hue increases and a direction in which a hue decreases.

14. The image processing apparatus according to claim 13, wherein a magnitude relationship of an increment of a monotonous increase in a color emphasis suppression coefficient between the two directions including the direction in which a hue increases and the direction in which a hue decreases is set according to a visual characteristic.

15. The image processing apparatus according to claim 14, wherein an increment of a monotonous increase in a color emphasis suppression coefficient corresponding to one direction, of the two directions including the direction in which a hue increases and the direction in which a hue decreases, in which a hue corresponding to a skin color is included is set to be smaller than an increment of a monotonous increase in a color emphasis suppression coefficient corresponding to another direction.

16. The image processing apparatus according to claim 14, wherein an increment of a monotonous increase in a color emphasis suppression coefficient corresponding to one direction, of the two directions including the direction in which a hue increases and the direction in which a hue decreases, in which a hue corresponding to blue is included is set to be larger than an increment of a monotonous increase in a color emphasis suppression coefficient corresponding to another direction.

17. The image processing apparatus according to claim 1, wherein the determination unit determines color information of a background image on which the writing content image is superimposed based on the color information of the writing target.

18. The image processing apparatus according to claim 17, wherein the determination unit determines a color corresponding to a statistical value of hues of the writing target as a color of the background image.

19. An image processing method executed by a computer, the method comprising:

determining, based on color information of writing content written on a detected writing target, color information of an output image generated from a writing content image that is an image of the writing content written on the detected writing target, wherein a color emphasis suppression coefficient is determined for each writing content pixel of a plurality of writing content pixels, the color emphasis suppression coefficient corresponding to a hue that the writing content pixel has according to a predetermined range from a statistical value of hues of the writing target.

20. A non-transitory computer-readable storage medium having embodied thereon a program, which when executed by a computer causes the computer to execute a method, the method comprising:

determining, based on color information of writing content written on a detected writing target, color information of an output image generated from a writing content image that is an image of the writing content written on the detected writing target, wherein a color emphasis suppression coefficient is determined for each writing content pixel of a plurality of writing content pixels, the color emphasis suppression coefficient corresponding to a hue that the writing content pixel has according to a predetermined range from a statistical value of hues of the writing target.

* * * * *